(12) United States Patent
Abe et al.

(10) Patent No.: US 10,375,388 B2
(45) Date of Patent: *Aug. 6, 2019

(54) MOVING PICTURE DECODING METHOD FOR DECODING A CURRENT BLOCK IN A TEMPORAL DIRECT MODE

(71) Applicant: Godo Kaisha IP Bridge 1, Tokyo (JP)

(72) Inventors: Kiyofumi Abe, Osaka (JP); Shinya Kadono, Fukuoka (JP); Satoshi Kondo, Kyoto (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,973

(22) Filed: Aug. 31, 2018

(65) Prior Publication Data

US 2018/0376136 A1     Dec. 27, 2018

Related U.S. Application Data

(63) Continuation of application No. 15/851,970, filed on Dec. 22, 2017, now Pat. No. 10,097,824, which is a
(Continued)

(30) Foreign Application Priority Data

Nov. 1, 2002   (JP) .................................. 2002-320458
Nov. 27, 2002  (JP) .................................. 2002-344580
Dec. 20, 2002  (JP) .................................. 2002-370600

(51) Int. Cl.
*H04N 7/12*      (2006.01)
*H04N 11/02*     (2006.01)
(Continued)

(52) U.S. Cl.
CPC ......... *H04N 19/103* (2014.11); *H04N 19/109* (2014.11); *H04N 19/16* (2014.11);
(Continued)

(58) Field of Classification Search
CPC .... H04N 19/103; H04N 19/109; H04N 19/16; H04N 19/172; H04N 19/176;
(Continued)

(56) References Cited

U.S. PATENT DOCUMENTS 5,801,778 A   9/1998 Ju
5,886,745 A   3/1999 Muraji et al.
(Continued)

FOREIGN PATENT DOCUMENTS

CN   1206298   1/1999
CN   1212561   3/1999
(Continued)

OTHER PUBLICATIONS

Faouzi Kossentini et al., "Predicative RD Optimized Motion Estimation for Very Low Bit-Rate Video Coding," IEEE Journal on Selected Areas in Communications, Dec. 1997, vol. 15, No. 9, pp. 1752-1763, ISSN 0733-8716.
(Continued)

*Primary Examiner* — Jessica M Prince
(74) *Attorney, Agent, or Firm* — Wenderoth, Lind & Ponack, LLP.

(57) ABSTRACT

A moving picture coding apparatus includes a motion compensation coding unit for deciding a coding mode for coding a current block to be coded and for generating predictive image data based on the coding mode, and includes a direct mode enable/disable judgment unit for judging whether or not scaling processing can be performed when the coding mode decided by the motion compensation coding unit is a temporal direct mode. When it is judged that the scaling
(Continued)

processing cannot be performed, the motion compensation coding unit performs motion compensation either by using another coding mode or without the scaling processing.

1 Claim, 23 Drawing Sheets

Related U.S. Application Data continuation of application No. 15/601,067, filed on May 22, 2017, now Pat. No. 9,888,238, which is a continuation of application No. 15/213,611, filed on Jul. 19, 2016, now Pat. No. 9,693,059, which is a continuation of application No. 10/498,088, filed as application No. PCT/JP03/12756 on Oct. 6, 2003, now Pat. No. 9,426,490.

(51) Int. Cl.
| | |
|---|---|
| *H04N 19/103* | (2014.01) |
| *H04N 19/176* | (2014.01) |
| *H04N 19/513* | (2014.01) |
| *H04N 19/61* | (2014.01) |
| *H04N 19/109* | (2014.01) |
| *H04N 19/16* | (2014.01) |
| *H04N 19/577* | (2014.01) |
| *H04N 19/172* | (2014.01) |
| *H04N 19/573* | (2014.01) |

(52) U.S. Cl.
CPC ......... *H04N 19/172* (2014.11); *H04N 19/176* (2014.11); *H04N 19/513* (2014.11); *H04N 19/573* (2014.11); *H04N 19/577* (2014.11); *H04N 19/61* (2014.11)

(58) Field of Classification Search
CPC .. H04N 19/513; H04N 19/573; H04N 19/577; H04N 19/61
See application file for complete search history.

(56) References Cited

U.S. PATENT DOCUMENTS

| | | | |
|---|---|---|---|
| 5,991,447 A | 11/1999 | Eifrig et al. | |
| 6,275,533 B1 | 8/2001 | Nishi | |
| RE38,563 E | 8/2004 | Eifrig | |
| 2002/0150159 A1 | 10/2002 | Zhong | |
| 2004/0001546 A1* | 1/2004 | Tourapis | H04N 19/56 375/240.12 |
| 2004/0057612 A1 | 3/2004 | Tabata | |
| 2005/0117649 A1* | 6/2005 | Wang | H04N 19/105 375/240.16 |
| 2008/0063075 A1* | 3/2008 | Kondo | H04N 19/105 375/240.16 |
| 2008/0069235 A1 | 3/2008 | Abe | |

FOREIGN PATENT DOCUMENTS

| | | |
|---|---|---|
| CN | 101873488 | 5/2012 |
| EP | 0 863 674 | 9/1998 |
| JP | 11-075191 | 3/1999 |

OTHER PUBLICATIONS

Kossentini, et al., "Predictive RD Optimized Motion Estimation for Very Low Bit-Rate Video Coding", IEEE Journal on Selected Communications, vol. 15, No. 9, Dec. 1997, pp. 1752-1763 and Abstract (attached—1 pg.).

Thomas Wiegand, International Organisation for Standardisation Organisation Internationale De Normalisation, ISO/IEC JTC1/SC29/WG11 Coding of Moving Pictures and Audio "Text of Final Committee Draft of Joint Video Specification (ITU-T Rec. H.264/ISO/IEC 14496-10 ACV) MPEG02/N4920", ISO/IEC JTC1/SC29/WG11 MPEG02/N4920 Klagenfurt, AT, Jul. 2002 (Jul. 2002), pp. I-XV, 1.

A. Joch et al., Performance Comparison of Video Coding Standards Using Lagrangian Coder Control: Proceedings 2002 International Conference on Image Processing. ICIP 2002. Rochester, NY, Sep. 22-25, 2002, International Conference on Image Processing, New York, NY, IEEE, US, vol. 2 of 3, Sep. 22, 2002 (Sep. 22, 2002) pp. 501-504.

European Search Report dated Jul. 6, 2010 issued in corresponding European Patent Application No. 09180894.9.

Jeon, Byeong-Moon, "Usage of Relative Timing Information in VCL," Joint Video Team (JVT) of ISO/IEC MPEG & ITU-T VCEG (ISO/IEC JTC1/SC29/WG11 and ITU-T SG16 Q.6) 4th Meeting, Klagenfurt, Austria, Jul. 22-26, 2002, pp. 1-7.

Canadian Office Action dated Dec. 6, 2010 issued in corresponding Canadian Application No. 2,470,717.

Extended European Search Report dated Feb. 14, 2017 for the corresponding European Patent Application No. 16192321.4.

Office Action dated Jun. 7, 2017 for the corresponding Indian Patent Application No. 7645/CHENP/2010.

Thomas Wiegand: "Editor's Proposed Draft Text Modifications for Joint Video Specification (ITU-T Rec. H.264 |ISO/IEC 14496-10 AVC), Draft 7", 5th Meeting: Geneva, Switzerland, Oct. 9-17, 2002.

* cited by examiner

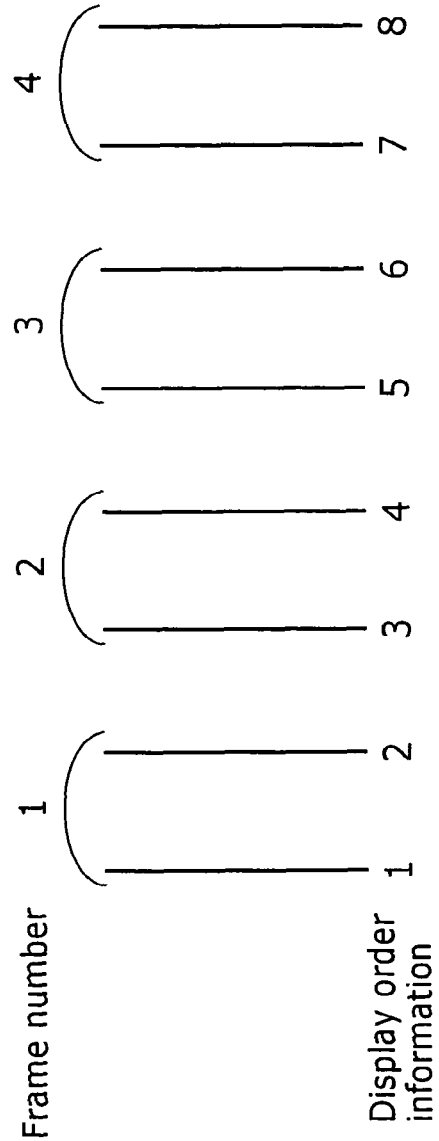
Fig. 4A PRIOR ART Interlaced
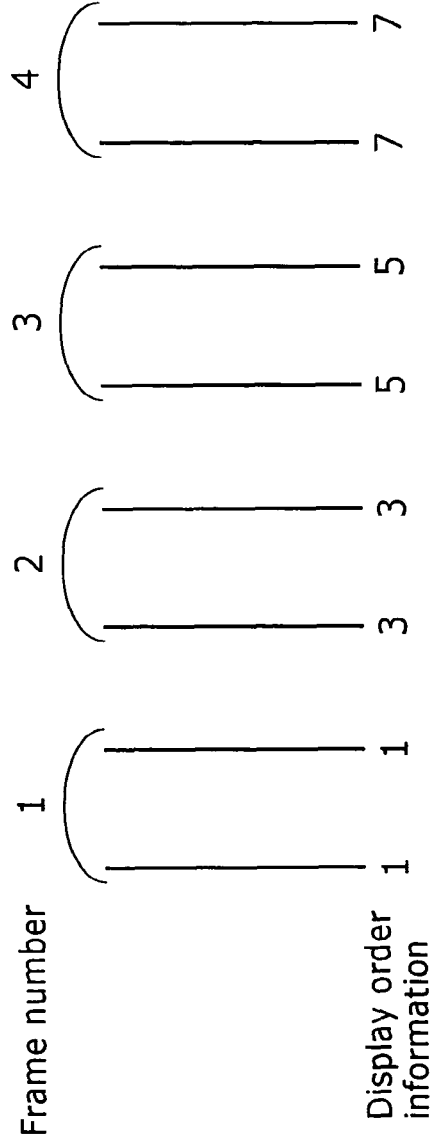
Fig. 4B PRIOR ART Progressive

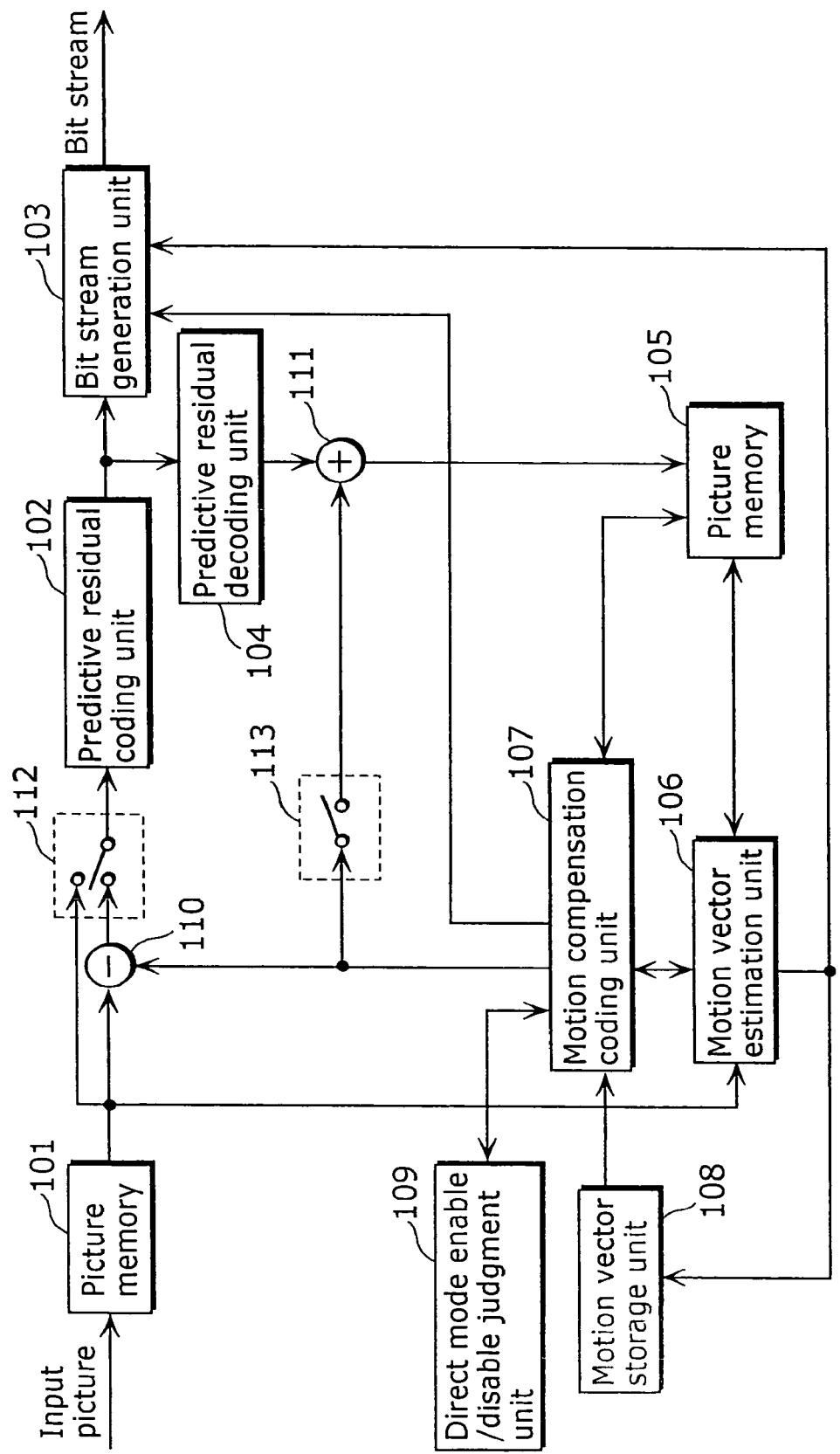

MOVING PICTURE DECODING METHOD FOR DECODING A CURRENT BLOCK IN A TEMPORAL DIRECT MODE

BACKGROUND OF THE INVENTION

1. Field of the Invention

The present invention relates to a moving picture coding method, a moving picture decoding method, a moving picture coding apparatus, a moving picture decoding apparatus for coding/decoding a moving picture, using either a frame structure or a field structure, and a program for executing these methods in software.

2. Background of the Related Art

In coding of a moving picture, compression of information of a volume is usually performed by eliminating redundancy both in spatial and temporal directions of the moving picture. Here, inter-picture prediction coding is employed as a method of eliminating the redundancy in the temporal direction. The inter-picture prediction coding uses a previous picture or a subsequent picture to a current picture to be coded in a display order as a reference picture when a picture is coded. Then, a motion is estimated using the reference pictures, and the information volume is compressed by removing the redundancy in the spatial direction for a differential value between a picture, to which motion compensation is performed, and the current picture.

In the moving picture coding method called H. 264 which is under the process of standardization, a picture for which intra-picture prediction coding is performed using only a current picture to be coded without reference pictures is called I-picture. A picture here means a unit of coding including both a frame and a field. A picture for which the inter-picture prediction coding is performed with reference to a single picture that is already coded is called P-picture whereas a picture for which the inter-picture prediction coding is performed referring simultaneously to two pictures that are already coded is called B-picture.

FIG. 1 is a pattern diagram showing a prediction relation of each picture in the moving picture coding method mentioned above. The vertical line in FIG. 1 represents a single picture, and its picture type (I, P and B) is indicated in the lower right-hand corner of each of the pictures. The arrows in the diagram indicate that the inter-picture prediction coding is performed as follows: the picture located at the starting edge of the arrow refers to the picture located at the ending edge of the arrow as a reference picture. For example, B-picture located secondly from the head is coded using the I-picture located in the head and the P-picture located fourthly from the head as reference pictures.

Under the H. 264 method, a coding mode called direct mode can be selected in the coding of B-pictures. The direct mode provides two types of methods: a temporal method and a spatial method. In the temporal direct mode, the current block itself does not have motion vectors and motion vectors used for the current block are estimated and generated by performing scaling processing based on a location relation according to display time between the pictures, considering the motion vector of other picture that is already coded as a reference motion vector. (See reference, for example, Japanese Laid-Open Patent Application No. H11-75191).

FIG. 2 is a pattern diagram showing a method of estimating and generating motion vectors in the temporal direct mode. P represents P-picture whereas B represents B-picture and the numbers put on the picture types indicate a display order of each of the pictures. Each of the pictures P1, B2, B3 and P4 respectively includes display order information T1, T2, T3 and T4. Here, a case of coding a block BL0 in the picture B3 shown in FIG. 2 in the temporal direct mode is illustrated.

In this case, a motion vector MV1 in a block BL1, co-locating with the block BL0 in the picture P4 that is already coded and located closely to the picture B3 in display order, is used. The motion vector MV1 is used for coding the block BL1 and refers to the picture P1. In this case, the motion vectors used for coding the block BL0 are as follows: a motion vector MV_F with respect to the picture P1 and a motion vector MV_B with respect to the picture P4. Assuming that the value of the motion vector MV1 is MV, the value of the MV_F is MVf and the value of the motion vector MV_B is MVb, the MVf and the MVb can be obtained using respective equations 1a and 1b shown below.

$$MVf = (T3-T1)/(T4-T1) \times MV \qquad \text{(Equation 1a)}$$

$$MVb = (T3-T4)/(T4-T1) \times MV \qquad \text{(Equation 1b)}$$

The motion compensation is thus performed for the block BL0 based on the reference pictures P1 and P4, using the motion vectors MV_F and the MV_B obtained by performing scaling processing for the motion vector MV1.

On the other hand, in the spatial direct mode, the current block itself does not have motion vectors, as is the case of temporal direct mode, and the motion vectors of the coded blocks spatially neighboring the current block are used for reference in the coding.

FIG. 3 is a pattern diagram showing a method of estimating and generating the motion vectors in the spatial direct mode. P represents P-picture whereas B represents B-picture, and the numbers put on the picture types indicate the display order of each of the pictures. Here, a case of coding the block BL0 in the picture B3 shown in FIG. 3 in the spatial direct mode is illustrated.

In this case, the motion vectors having referred to the coded pictures that are located in the positions closest to the current block in display order, out of respective motion vectors MVA1, MVB1 and MVC1 of the coded blocks respectively including one of three pixels A, B and C that are located closely to the current block BL0, are determined as candidates for a motion vector of the current block. When three motion vectors are determined as candidates, a medium value of the three values is obtained as a motion vector for the current block. When two motion vectors are determined as candidates, an average value of the two values is obtained as a motion vector for the current block. When only one motion vector is determined as a candidate, the determined motion vector is obtained as a motion vector for the current block. In the example shown in FIG. 3, the motion vectors MVA1 and MVC1 are obtained with reference to the picture P2 whereas the motion vector MVB1 is obtained with reference to the picture P1. Therefore, the average value of the motion vectors MVA1 and MVC1, referring to the picture P2 that is already coded and located in a position closest to the current picture in display order, is obtained as the first motion vector for the current block, MV_F. The same applies when the second motion vector MV_B is obtained.

In the coding method of the H. 264, in the case of a progressive picture, one picture is frame coded as a frame and furthermore, one picture is allowed to be field coded as separate two fields, a top field and a bottom field, as in the case of interlaced picture.

FIGS. 4A and 4B are pattern diagrams showing display order information assigned for the field of the interlaced picture and the progressive picture. Two vertical lines respectively having the same frame number represent that they are fields. For the interlaced picture, the display order information is assigned so that the top field and the bottom field are at regular intervals as shown in FIG. 4A. For the progressive picture, it is defined that two fields can represent an exact relation in display order by having the same display order information as shown in FIG. 4B. In the following description, a picture with two fields belonging to the same frame and having the same display order information is called a progressive picture, otherwise, called an interlaced picture. However, the case is not limited to this and any picture can have two fields belonging to the same frame and having the same display order information.

When the field coding is performed for the interlaced picture and the progressive picture, and the temporal direct mode is selected, the scaling of the motion vector is performed using the method explained in the Background Art as well as the display order information assigned for each field. Here, there is a case in which the two reference pictures are a top field and a bottom field belonging to the same frame. The following describes the respective cases of field coding the interlaced picture and the progressive picture.

FIG. 5 is a pattern diagram showing a method of estimating and generating the motion vectors in temporal direct mode in the case of the interlaced picture. P represents P-picture whereas B represents B-picture, and the numbers put on the picture types represent display order of each of the pictures. Here, a case of field coding the block BL0 in the picture B2 shown in FIG. 5 in the temporal direct mode is described.

In this case, a motion vector MV1 of the block BL1, co-locating with the block BL0 in the picture P3 that is a backward reference picture of the picture B2, is used. The motion vector MV1 is a motion vector used for coding the block BL1 and refers to a top field of the same picture P3. The motion vectors MV_F and MV_B used for coding the block BL0 can be obtained as shown below, using the equations 1a and 1b described above.

$$MVf=(4-5)/(6-5) \times MV = -MV$$

$$MVb=(4-6)/(6-5) \times MV = -2MV$$

FIG. 6 is a pattern diagram showing a method of estimating and generating the motion vectors in temporal direct mode for a progressive picture. P represents a P-picture whereas B represents a B-picture, and the numbers put on the picture types indicate display order of each of the pictures. Here, the case of field coding the block BL0 in the picture B2 shown in FIG. 6 in the temporal direct mode is described.

In this case, the motion vector MV1 of the block BL1, co-locating with the block BL0 in the picture P3 that is a backward reference picture of the picture B2, is used. The motion vector MV1 is a motion vector used for coding the block BL1 and refers to a top field of the same picture P3. In this case, the motion vectors MV_F and MV_B used for coding the block BL0 cannot be obtained since the denominators indicate 0 in the equations 1a and 1b above.

$$MVf=(3-5)/(5-5) \times MV \text{ operation is not allowed}$$

$$MVb=(3-5)/(5-5) \times MV \text{ operation is not allowed}$$

Thus, when the field coding is performed for the progressive picture, the motion vectors cannot be generated by performing the scaling processing in the case where temporal direct mode is selected and the two reference pictures are the top field and the bottom field belonging to the same frame.

Similarly, when the field coding is performed for the interlaced picture and the progressive picture, and the spatial direct mode is selected, a motion vector referring to the coded picture that is located in a position closest to the current picture in display order is determined as a candidate for a motion vector of the current block, using the display order information assigned for each field. Here, there is a case that the pictures referred to by the motion vectors can be a top field and a bottom field belonging to the same frame.

FIG. 7 is a pattern diagram showing a method of estimating and generating the motion vectors in the spatial direct mode for a progressive picture. P represents a P-picture and B represents a B-picture whereas the numbers put on the picture types indicate display order of each of the pictures and T represents a top field while B represents a bottom field. Here, the case of field coding the block BL0 in the picture B3_T shown in FIG. 7 in the spatial direct mode is illustrated.

In this case, respective motion vectors MVA1, MVB1 and MVC1 of the coded blocks which respectively include one of three pixels of A, B and C, that are located closely to the current block BL0, refer respectively to the fields P2_T, P1_B and P2_B. The fields P2_T and P2_B have the same display order information since they are the top field and the bottom field belonging to the same frame. Therefore, it is impossible to specify which of the fields P2_T and P2_B is located in a position closest to the current block in display order. Consequently, the motion vectors can neither be estimated nor generated for the current block.

BRIEF SUMMARY OF THE INVENTION

The present invention therefore is conceived considering the above circumstances and aims to provide a moving picture coding/decoding method that can obtain a motion vector without fail, when the moving picture is field coded/decoded and the direct mode is selected.

In order to achieve the above object, the moving picture coding method according to the present invention is a method for coding a moving picture, using either a frame structure or a field structure. The method comprises: a motion vector calculation step of calculating motion vectors for each block that constitutes a picture, using coded pictures as reference pictures; a mode decision step of deciding a coding mode for coding a current block to be coded; a scaling judgment step of judging whether or not the motion vectors for the current block can be estimated and generated, when the coding mode decided in the mode decision step is a coding mode in which (i) a motion vector of a picture that is already coded and located closely to the current picture in display order is used as a reference motion vector and (ii) the motion vectors for the current block are estimated and generated by performing scaling processing for the reference motion vector based on a location relation between the current picture and the reference pictures according to the display order; and a motion compensation step of performing motion compensation by using either the coding mode decided in the mode decision step or another coding mode, based on a result of the judgment in the scaling judgment step.

Thus, it is possible to code the current block by performing processing such as changing the coding mode even though the scaling processing cannot be performed, when the motion vector of the coded picture that is located closely to the current picture in display order is used as a reference motion vector and the coding is performed in the temporal direct mode to estimate and generate the motion vectors for the current block by performing the scaling processing for the reference motion vector based on a location relation between the current picture and the reference pictures according to the display order.

Also, the moving picture coding method according to the present invention includes a method for coding a moving picture, using either a frame structure or a field structure. This method includes: a motion vector calculation step of calculating motion vectors for each block that constitutes a picture, using coded pictures as reference pictures; an estimation judgment step of judging whether or not motion vectors for a current block to be coded can be estimated and generated, when the motion vectors for the current block are estimated and generated based on at least one motion vector referring to the coded pictures that are located in positions closest to a current picture to be coded, out of motion vectors of coded blocks that are located spatially close to the current block; and a closest picture decision step of deciding that a picture is located in a position closest to the current picture, using information other than display order information, when it is judged in the estimation judgment step that the motion vectors cannot be generated.

Thus, it is possible to estimate and generate the motion vectors and thereby code the current block by deciding the picture that is located in the position closest to the current picture even though the motion vectors can neither be estimated nor generated based on the display order information assigned for the pictures, when the coding is performed in the spatial direct mode to estimate and generate at least one motion vectors for the current block based on the motion vector which has referred to the coded picture that is located in the position closest to the current picture in display order, out of the motion vectors of coded blocks that are located spatially close to the current block.

The moving picture decoding method according to the present invention includes a method for decoding a moving picture, using either a frame structure or a field structure. This method comprises: a motion vector calculation step of calculating motion vectors for each block that constitutes a picture, using decoded pictures as reference pictures; a mode extraction step of extracting a decoding mode for decoding a current block to be decoded; a scaling judgment step of judging whether or not the motion vectors for the current block can be estimated and generated, when the decoding mode extracted in the mode extraction step is a decoding mode in which (i) the motion vector of the decoded picture that is located closely to a current picture to be decoded in display order is used as a reference motion vector and (ii) the motion vectors for the current block are estimated and generated by performing scaling processing for the reference motion vector based on a location relation between the current picture and the reference pictures according to the display order; and a motion compensation step of performing motion compensation by using either the decoding mode extracted in the mode extraction step or another decoding mode, based on a result of the judgment in the scaling judgment step.

Thus, it is possible to decode the current block by performing processing such as the changing of the decoding mode, when the scaling processing cannot be performed even though the coding mode extracted at the time of coding is the temporal direct mode.

Also, the moving picture decoding method according to the present invention including a method for decoding a moving picture, using either a frame structure or a field structure, This method comprises: a motion vector calculation step of calculating motion vectors for each block that constitutes a picture, using decoded pictures as reference pictures; an estimation judgment step of judging whether or not motion vectors for a current block to be decoded can be estimated and generated, when the motion vectors for the current block are estimated, generated and decoded based on at least one motion vector referring to the decoded pictures that are located in positions closest in display order to a current picture to be decoded, out of the motion vectors of decoded blocks that are located spatially close to the current block; and a closest picture decision step of deciding that a picture is located in a position closest to the current picture, using information other than display order information, when it is judged in the estimation judgment step that the motion vectors cannot be generated.

Thus, it is possible to estimate and generate the motion vectors by deciding the picture that is located in the position closest to the current picture and thereby decode the current block even though the motion vectors can neither be estimated nor generated based on the display order information assigned for the pictures, when decoding is performed in the spatial direct mode.

Furthermore, the present invention can be realized not only as the moving picture coding method and the moving picture decoding method as described above but also as a moving picture coding apparatus and a moving picture decoding apparatus having the characteristic steps included in such moving picture coding/decoding method as units and also as a program having a computer execute these steps. Such a program can be surely distributed via a storage medium such as a CD-ROM or a transmission medium such as the Internet.

The moving picture coding method according to the present invention may include any of components (1)~(11) described below.

(1) A method for coding a moving picture, using either a frame structure or a field structure. This method comprises: a motion vector calculation step of calculating motion vectors for each block that constitutes a picture, using coded pictures as reference pictures; a mode decision step of deciding a coding mode for coding a current block to be coded; a scaling judgment step of judging whether or not the motion vectors for the current block can be estimated and generated, when the coding mode decided in the mode decision step is a coding mode in which (i) a motion vector of the coded picture located closely in display order to a current picture to be coded is used as a reference motion vector and (ii) the motion vectors for the current block are estimated and generated by performing scaling processing for the reference motion vector based on a location relation between the current picture and the reference pictures according to the display order; and a motion compensation step of performing motion compensation by using either the coding mode decided in the mode decision step or another coding mode, based on a result of the judgment in the scaling judgment step.

(2) In the scaling judgment step, it is judged that the motion vectors for the current block can neither be estimated nor generated by performing the scaling processing, when two of the reference pictures used for the scaling processing have the same display order information (e.g., when a decoded picture that includes a co-located block and when a reference picture that is referred to by the co-located block in a decoding process of the co-located block are both displayed at a same time as a result of display order information of the decoded picture that is identical to display order information of the reference picture).

(3) In the scaling judgment step, it is judged that the motion vectors for the current block can neither be estimated nor generated by performing the scaling processing, when two of the reference pictures used for the scaling processing are a top field and a bottom field, belonging to a same frame and having same display order information.

(4) In the motion compensation step, when it is judged in the scaling judgment step that the motion vectors cannot be generated, the motion compensation is performed by using another coding mode to perform coding based on the motion vectors calculated for the current block in the motion vector calculation step.

(5) In the motion compensation step, when it is judged in the scaling judgment step that the motion vectors cannot be generated, the motion compensation is performed, without the scaling processing, by using the coding mode decided in the mode decision step and using the motion vectors estimated and generated for the current block as predetermined vectors.

(6) At least one of the predetermined vectors is a 0 vector, and in the motion compensation step, when it is judged in the scaling judgment step that the motion vectors cannot be generated, the motion compensation is performed, without the scaling processing, by using the coding mode decided in the mode decision step and using at least one of the motion vectors estimated and generated for the current block, as a 0 vector.

(7) In the motion compensation step, when it is judged in the scaling judgment step that the motion vectors cannot be generated, the motion compensation is performed by using another coding mode to estimate, generate and code the motion vectors for the current block, based on at least one motion vector of coded blocks that are located spatially close to the current block.

(8) A method for coding a moving picture, using either a frame structure or a field structure. The method comprises: a motion vector calculation step of calculating motion vectors for each block that constitutes a picture using coded pictures as reference pictures; an estimation judgment step of judging whether or not motion vectors for a current block to be coded can be estimated and generated, when the motion vectors for the current block are estimated and generated based on at least one motion vector referring to the coded pictures that are located in positions closest in display order to a current picture to be coded, out of motion vectors of coded blocks that are located spatially close to the current block; and a closest picture decision step of deciding that a picture is located in a position closest to the current picture, based on information other than display order information, when it is judged in the estimation judgment step that the motion vectors cannot be generated.

(9) In the estimation judgment step, it is judged that the motion vectors for the current block can neither be estimated nor generated, when the respective motion vectors of the coded blocks include a plurality of motion vectors referring to the coded picture that is located in the position closest to the current picture in display order, the plurality of the reference pictures are a top field and a bottom field, belonging to a same frame and having same display order information.

(10) In the closest picture decision step, a picture having a same attribute as the current picture is determined to be a picture that is located in a position closest to the current picture, out of the top field and the bottom field, belonging to the same frame and having the same display order information, when it is judged in the estimation judgment step that the motion vectors cannot be generated.

(11) In the closest picture decision step, a picture coded at a later time is determined to be a picture that is located in a position closest to the current picture, out of the top field and the bottom field, belonging to the same frame and having the same display order information, when it is judged in the estimation judgment step that the motion vectors cannot be generated.

The moving picture decoding method according to the present invention may include any components of (12)~(22) described below.

(12) A method for decoding a moving picture, using either a frame structure or a field structure. This method comprises: a motion vector calculation step of calculating motion vectors for each block that constitutes a picture, using decoded pictures as reference pictures; a mode extraction step of extracting a decoding mode for decoding a current block to be decoded; a scaling judgment step of judging whether or not the motion vectors for the current block can be estimated and generated, when the decoding mode extracted in the mode extraction step is a decoding mode in which (i) a motion vector of the decoded picture located closely in display order to a current picture to be decoded is used as a reference motion vector and (ii) the motion vectors for the current block are estimated and generated by performing scaling processing for the reference motion vector based on a location relation between the current picture and the reference pictures according to the display order; and a motion compensation step of performing motion compensation by using either the decoding mode extracted in the mode extraction step or another decoding mode, based on a result of the judgment in the scaling judgment step.

(13) In the scaling judgment step, it is judged that the motion vectors for the current block can neither be estimated nor generated by performing the scaling processing, when two of the reference pictures used for the scaling processing have same display order information.

(14) In the scaling judgment step, it is judged that the motion vectors can neither be estimated nor generated by performing the scaling processing, when two of the reference pictures used for the scaling processing are a top field and a bottom field, belonging to a same frame and having same display order information.

(15) In the motion compensation step, when it is judged in the scaling judgment step that the motion vectors cannot be generated, the motion compensation is performed by using another decoding mode to perform decoding based on the motion vectors estimated for the current block in the motion vector estimation step.

(16) In the motion compensation step, when it is judged in the scaling judgment step that the motion vectors cannot be generated, the motion compensation is performed, without the scaling processing, by using the decoding mode extracted in the mode extraction step and using the motion vectors estimated and generated for the current block, as predetermined vectors.

(17) At least one of the predetermined vectors is a 0 vector, and in the motion compensation step, when it is judged in the scaling judgment step that the motion vectors cannot be generated, the motion compensation is performed, without the scaling processing, by using the decoding mode extracted in the mode extraction step and using at least one of the motion vectors estimated and generated for the current block, as a 0 vector.

(18) In the motion compensation step, when it is judged in the scaling judgment step that the motion vectors cannot be generated, the motion compensation is performed by using another decoding mode to estimate, generate and decode the motion vectors for the current block based on at least one motion vector of decoded blocks that are located spatially close to the current block.

(19) A method for decoding a moving picture, using either a frame structure or a field structure. This method comprises: a motion vector calculation step of calculating motion vectors for each block that constitutes a picture, using decoded pictures as reference pictures; an estimation judgment step of judging whether or not motion vectors for a current block to be decoded can be estimated and generated, when the motion vectors for the current block are estimated, generated and decoded based on at least one motion vector referring to the decoded pictures that are located in positions closest in display order to a current picture to be decoded, out of the motion vectors of decoded blocks that are located spatially close to the current block; and a closest picture decision step of deciding that a picture is located in a position closest to the current picture, using information other than display order information, when it is judged in the estimation judgment step that the motion vectors cannot be generated.

(20) In the estimation judgment step, it is judged that the motion vectors for the current block can neither be estimated nor generated, when the respective motion vectors of the decoded blocks include a plurality of motion vectors referring to the decoded picture that is located in a position closest to the current picture in display order and the plurality of the reference pictures are a top field and a bottom field, belonging to a same frame and having same display order information.

(21) In the closest picture decision step, a picture having a same attribute as the current picture is decided as a picture that is located in a position closest to the current picture, out of the top field and the bottom field, belonging to the same frame and having the same display order information, when it is judged in the estimation judgment step that the motion vectors cannot be generated.

(22) In the closest picture decision step, a picture that is decoded at a later time is determined to be a picture that is located in a position closest to the current picture, out of the top field and the bottom field, belonging to the same frame and having the same display order information, when it is judged in the estimation judgment step that the motion vectors cannot be generated.

As it is apparent from the above description, with the moving picture coding method according to the present invention it is possible to code the current block by generating the motion vectors without fail, when the coding is performed either in the temporal direct mode or in the spatial direct mode.

With the moving picture decoding method according to the present invention, it is also possible to decode the current block by generating the motion vectors without fail, when the decoding is performed either in the temporal direct mode or in the spatial direct mode.

BRIEF DESCRIPTION OF DRAWINGS

FIGS. 4A and 4B are pattern diagrams showing display order information assigned for a field of an interlaced picture and a progressive picture.

FIG. 8 is a block diagram showing a structure of an embodiment of a moving picture coding apparatus according to the present invention.

FIG. 9A shows an inputting order whereas FIG. 9B shows a reordering order.

FIG. 19A is an illustration showing a physical format of a flexible disk that is a main body of the storage medium. FIG. 19B is an illustration showing a full appearance of the flexible disk, a structure at cross section and the flexible disk itself. FIG. 19C is an illustration showing a structure for recording/reproducing the program onto the flexible disk FD.

DETAILED DESCRIPTION OF THE INVENTION

Figure 1:
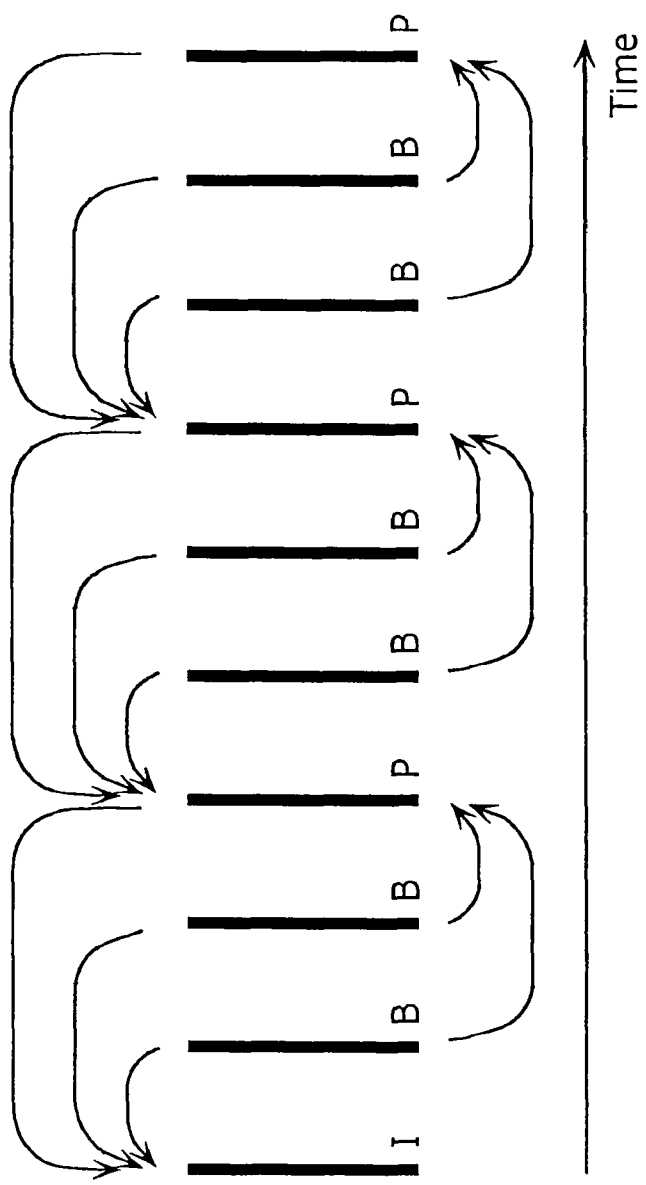
FIG. 1 is a pattern diagram showing a prediction relation of each picture according to a conventional moving picture coding method.

The following describes embodiments according to the present invention in detail with reference to the diagrams.

First Embodiment

FIG. 8 is a block diagram showing a structure of an embodiment of a moving picture coding apparatus using the moving picture coding method according to the present invention.

The moving picture coding apparatus includes, as shown in FIG. 8, a picture memory 101, a predictive residual coding unit 102, a bit stream generation unit 103, a predictive residual decoding unit 104, a picture memory 105, a motion vector estimation unit 106, a motion compensation coding unit 107, a motion vector storage unit 108, a direct mode enable/disable judgment unit 109, a subtraction unit 110, an addition unit 111 and switches 112 and 113.

The picture memory 101 stores a moving picture inputted on a picture-by-picture basis in display order. The motion vector estimation unit 106 uses coded reconstructed image data as a reference picture and estimates motion vectors indicating positions estimated to be optimal for the estimation within a search range in the picture. The motion compensation coding unit 107 decides a coding mode for a block, using the motion vectors estimated by the motion vector estimation unit 106, and generates predictive image data based on the coding mode. The coding mode indicates how to code a macroblock.

The motion vector storage unit 108 stores the motion vectors estimated by the motion vector estimation unit 106. The direct mode enable/disable judgment unit 109 judges whether or not scaling processing can be performed, when the coding mode decided by the motion compensation coding unit 107 is a temporal direct mode, and determines the coding mode. The direct mode enable/disable judgment unit 109 judges whether the motion vectors for the current block can be estimated and generated, when the coding mode is a spatial direct mode. The subtraction unit 110 calculates a differential between the image data read out from the picture memory 101 and the predictive image data inputted by the motion compensation coding unit 107 and generates predictive residual image data.

The predictive residual coding unit 102 performs coding processing such as frequency conversion and quantization for the inputted predictive residual image data, and generates coded data. The bit stream generation unit 103 performs variable length coding or the like for the inputted coded data and furthermore, generates a bit stream by adding information on the motion vectors and the coding mode, inputted from the motion compensation coding unit 107.

The predictive residual decoding unit 104 performs decoding processing such as inverse quantization and inverse frequency conversion for the inputted coded data, and generates decoded differential image data. The addition unit 111 adds the decoded differential image data inputted from the predictive residual decoding unit 104, to the predictive image data inputted from the motion compensation coding unit 107, and generates reconstructed image data. The picture memory 105 stores the generated reconstructed image data.

The following describes an operation of the moving picture coding apparatus constructed as above.

Figure 9A:
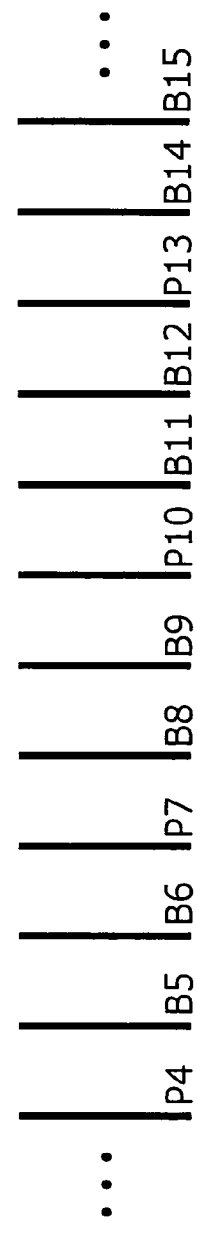
FIGS. 9A and 9B are illustrations showing an order of pictures in a picture memory.
Figure 9B:

FIGS. 9A and 9B are illustrations indicating an order of each picture in the picture memory 101. FIG. 9A shows an inputting order whereas FIG. 9B shows a re-ordering order. Here, the vertical line represents a picture. As for the marks put in the lower right-side of each of the pictures, the alphabet in the head indicates picture types (I, P or B) whereas the numbers indicate picture numbers in display order. P-picture uses an I-picture or a P-picture located closely to and forward of the current picture in display order, whereas B-picture uses (i) an I-picture or a P-picture located closely to and forward of the current picture in display order, and (ii) an I-picture or a P-picture located backward of the current picture in display order, as reference pictures.

An input image is inputted, for example, into the picture memory 101 on a picture-by-picture basis in display order as shown in FIG. 9A. Each of the pictures inputted in the picture memory 101 is re-ordered, for example, in a coding order as shown in FIG. 9B, when the picture type to be coded is determined. The re-ordering into the coding order is operated based on the reference relation in the inter-picture prediction coding so that the pictures used as reference pictures are coded prior to the picture that refers to these reference pictures.

Each of the pictures re-ordered in the picture memory 101 is read out per macroblock that is divided, for instance, into a group of 16 (horizontal)×16 (vertical) pixels. The motion compensation and the estimation of the motion vectors are operated per block that is divided, for instance, into a group of 8 (horizontal)×8 (vertical) pixels.

For the subsequent operation, a case in which a current picture to be coded is a B-picture is described.

The inter-picture prediction coding using bi-directional reference is performed for B-pictures. For example, when coding a picture B11 in the example shown in FIG. 9A, the forward reference pictures in display order are pictures P10, P7 and P4 whereas the backward reference pictures in display order is a picture P13. Here, a case in which B-pictures cannot be used as reference pictures when another picture is coded is considered.

The macroblock in the picture B11 read out from the picture memory 101 is inputted to the motion vector estimation unit 106 and the subtraction unit 110.

The motion compensation coding unit 107 decides whether to code each block in the macroblock using either a frame structure or a field structure. The decision is made, for example, by obtaining a dispersion of pixel values in the block using both the frame structure and the field structure, and selecting the one with a small dispersion. Each picture may be coded on a picture-by-picture basis using either the frame structure or the field structure.

The motion vector estimation unit 106 estimates both a forward motion vector and a backward motion vector for each of the blocks in the macroblock using the reference pictures stored in the picture memory 105 either as a frame or a field, according to the decision on the coding using either the frame structure or the field structure. Here, reconstructed image data of the pictures P10, P7 and P4 stored in the picture memory 105 are used as forward reference pictures and reconstructed image data of the picture P13 is used as a backward reference picture. The motion vector estimation unit 106 outputs the estimated motion vectors to the motion compensation coding unit 107.

The motion compensation coding unit 107 decides the coding mode for the macroblock, using the motion vectors estimated by the motion vector estimation unit 106. Here, the coding mode for B-pictures can be selected, for instance, from intra-picture prediction coding, inter-picture prediction coding using forward motion vector, inter-picture prediction coding using backward motion vector, inter-picture prediction coding using bi-directional motion vectors, and direct mode. As for the direct mode, either a temporal direct mode or a spatial direct mode is specified in advance. Regarding the decision of the coding mode, a mode in which coding error is the smallest due to the small bit amount is selected normally.

The following describes an operation of determining a coding mode performed by the direct mode enable/disable judgment unit 109, when it is selected to code in the direct mode. The operation of determining the coding mode can be performed using any of the methods 1~3 described below.

(Method 1)

Figure 10:
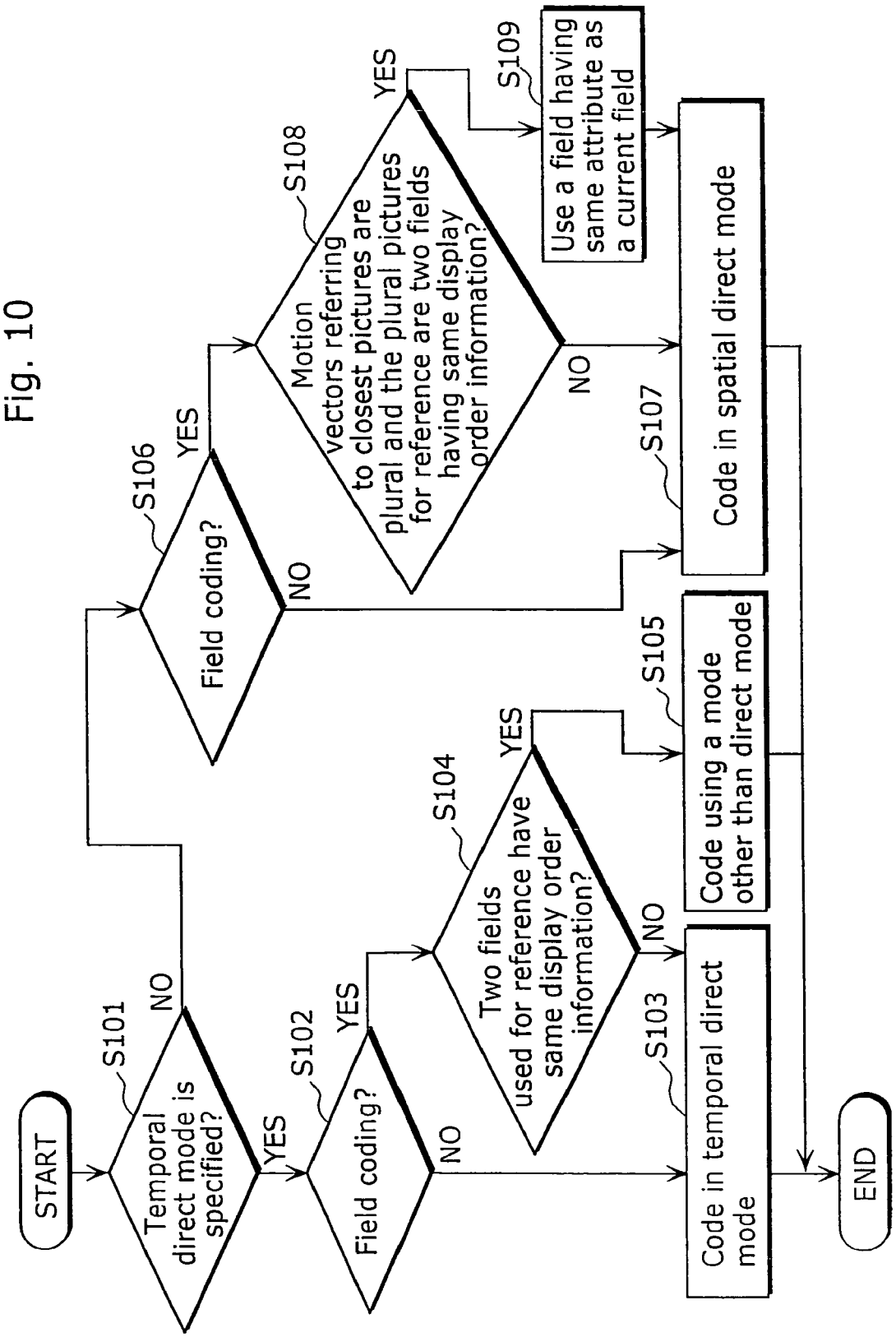
FIG. 10 is a flowchart showing an operation of determining a coding mode using method 1 employed by a direct mode enable/disable judgment unit.

FIG. 10 is a flowchart showing an operation of determining a coding mode using method 1. The motion compensation coding unit 107 selects to code in a direct mode and notifies the direct mode enable/disable judgment unit 109 of the selected mode. The direct mode enable/disable judgment unit 109 which is notified firstly determines whether or not a temporal direct mode is specified (Step S101). When it is judged that the temporal direct mode is specified, the direct mode enable/disable judgment unit 109 determines whether or not a field coding is selected (Step S102). When it is judged that the filed coding is not selected, the direct mode enable/disable judgment unit 109 instructs the motion compensation coding unit 107 to perform coding in the temporal direct mode (Step S103). On the other hand, when it is judged that the field coding is selected, the direct mode enable/disable judgment unit 109 judges whether or not the motion vectors used for the current block can be estimated and generated by performing scaling processing (Step S104). Namely, the enable/disable judgment unit 109 judges whether or not two of the reference pictures belong to the same frame and are a top field and a bottom field, having the same display order information. When scaling processing can be performed as a result (NO in the judgment of the condition in Step S104), the direct mode enable/disable judgment unit 109 instructs the motion compensation coding unit 107 to code in the temporal direct mode (Step S103). On the other hand, when the scaling processing cannot be performed (YES in the judgment of the condition in Step S104), the direct mode enable/disable judgment unit 109 instructs the motion compensation coding unit 107 to perform coding using a mode other than the direct mode (Step S105).

As a result of the determination described above (Step S101), when it is judged that the selected mode is not the temporal direct mode, (namely a spatial direct mode), the direct mode enable/disable judgment unit 109 judges whether or not the field coding is selected (Step S106). When it is judged that the field coding is not selected the direct mode enable/disable judgment unit 109 instructs the motion compensation coding unit 107 to perform coding in the spatial direct mode (Step S107).

As a result of the determination described above (Step S106), when it is judged that the field coding is selected, the direct mode enable/disable judgment unit 109 judges whether or not the motion vectors used for the current block can be estimated and generated in the spatial direct mode, based on the display order information assigned for the pictures (Step S108). Namely, it judges whether or not the respective motion vectors of the three coded blocks respectively including one of three pixels that are located closely to the current block include a plurality of motion vectors referring to the coded picture that is located in the position closest to the current picture (field) in display order, and also, whether or not the plurality of the reference pictures belong to the same frame, as a top field and a bottom field, having the same display order information. When the above conditions are satisfied, the direct mode enable/disable judgment unit 109 judges that the motion vectors can neither be estimated nor generated.

As a result of the determination above (Step S108), when judging that the motion vectors can be estimated and generated (NO in the judgment of the conditions in Step S108), the direct mode enable/disable judgment unit 109 instructs the motion compensation coding unit 107 to perform coding in the spatial direct mode (Step S107).

On the other hand, when judging that the motion vectors can neither be estimated nor generated (YES in the judgment of the conditions in Step S108), the direct mode enable/disable judgment unit 109 instructs the motion compensation coding unit 107 to consider the field having the same attribute as a current field to be coded, as a field closest to the current field in display order, out of the top field and the bottom field which have the same display order information (Step S109). Here, the field having the same attribute means a top field when the current field is a top field and a bottom field when the current field is a bottom field. Taking this into consideration, the direct mode enable/disable judgment unit 109 instructs the motion compensation coding unit 107 to perform coding in the spatial direct mode (Step S107).

(Method 2)

Figure 11:
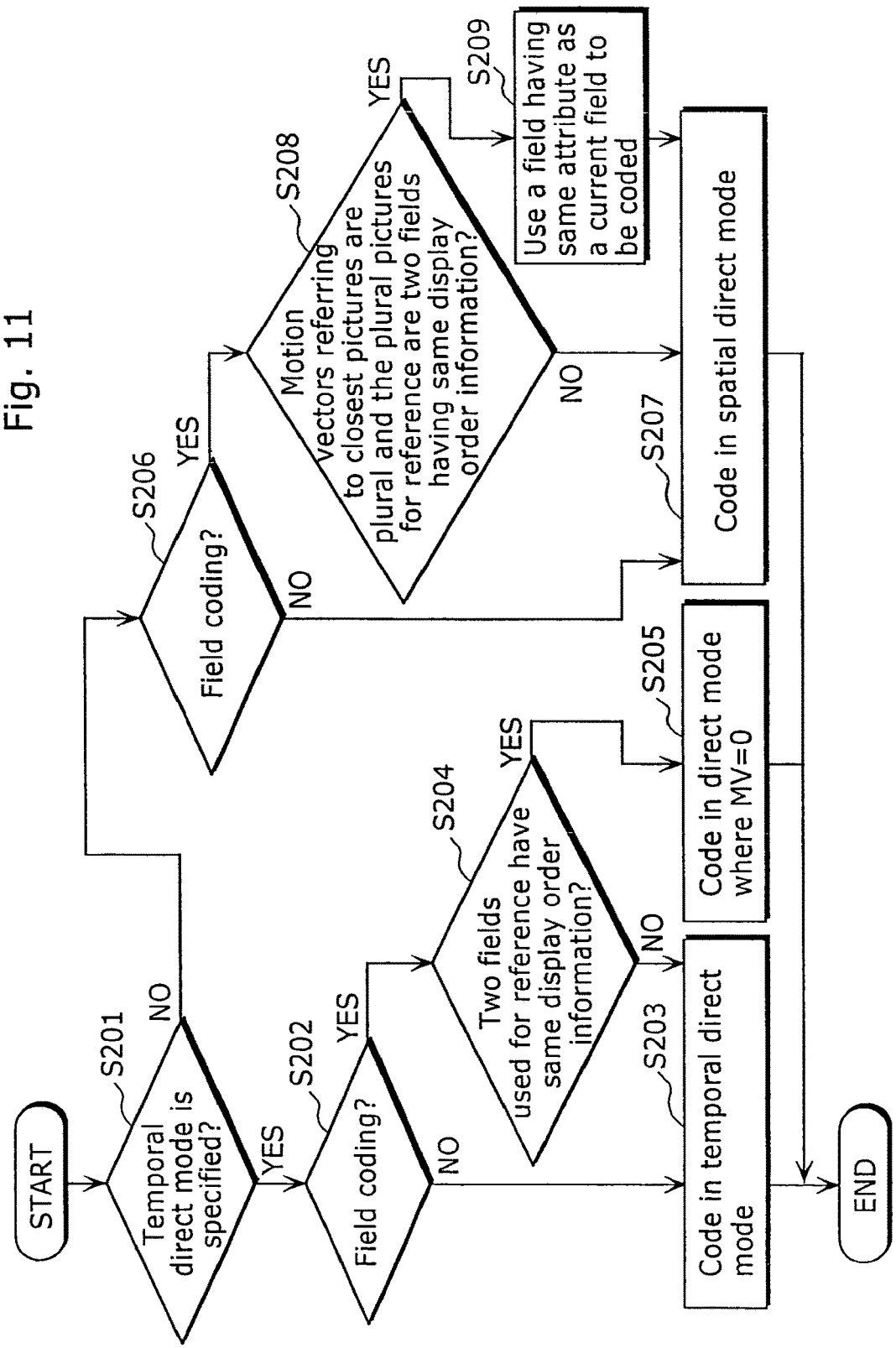
FIG. 11 is a flowchart showing an operation of determining a coding mode using method 2 employed by the direct mode enable/disable judgment unit.

FIG. 11 is a flowchart showing an operation of determining a coding mode using the method 2. The processing except for the processing in the case of judging that the field coding is selected and judging that the scaling processing cannot be performed (Steps S201~S204, S206~S209) is the same as described in method 1, therefore, the description is abbreviated.

When it is judged that the field coding is selected and that the scaling processing cannot be performed, the direct mode enable/disable judgment unit 109 instructs the motion compensation coding unit 107 to perform coding in the temporal direct mode using a motion vector indicating "0" (Step S205).

(Method 3)

Figure 12:
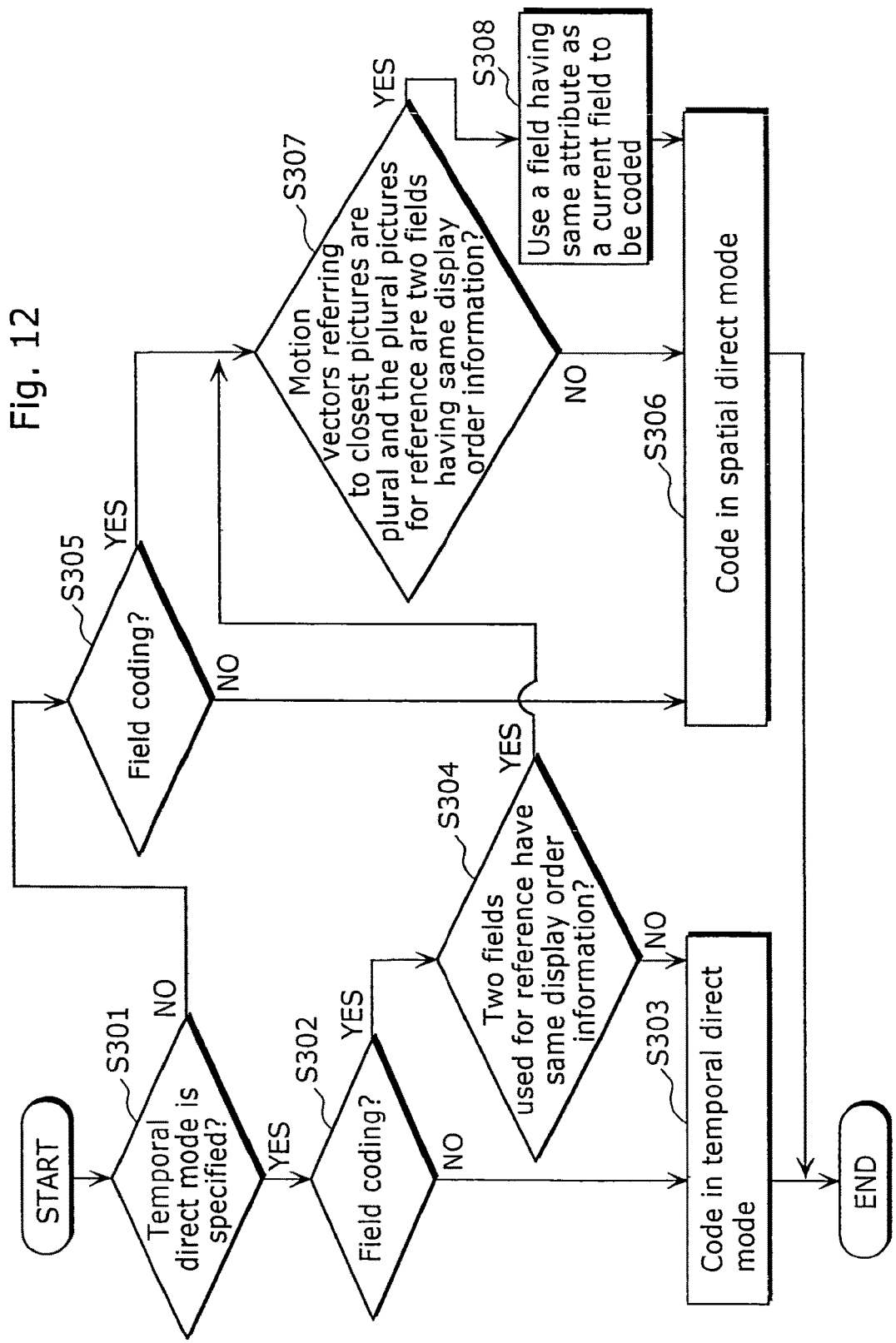
FIG. 12 is a flowchart showing an operation of determining a coding mode using method 3 employed by the direct mode enable/disable judgment unit.

FIG. 12 is a flowchart showing an operation of determining a coding mode using the method 3. The processing except for the processing in the case of judging that the field coding is selected and judging that the scaling processing cannot be performed (Step S301~S306, S308) is the same as the one described in method 1, therefore, the description is abbreviated.

When it is judged that the field coding is selected and that the scaling processing cannot be performed, the direct mode enable/disable judgment unit 109 judges whether or not the motion vectors used for the current block can be estimated and generated in the spatial direct mode (Step S307). The subsequent operation is as same as the one described in method 1, therefore the description is abbreviated.

Figure 13:
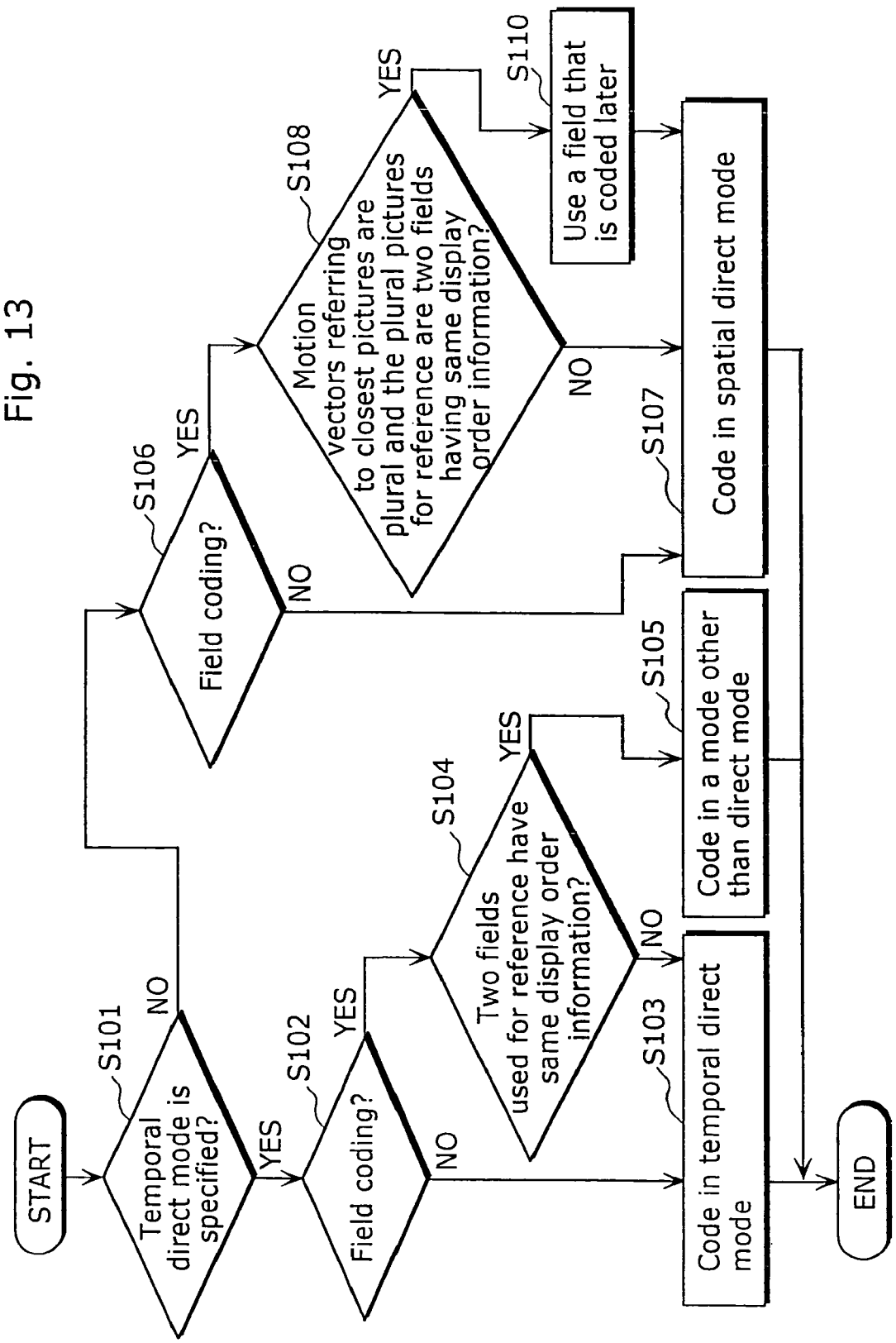
FIG. 13 is a flowchart showing an operation of determining a coding mode using method 1' employed by the direct mode enable/disable judgment unit.

As for the processing described above for the case in which it is judged that the motion vectors can neither be estimated nor generated in the spatial direct mode as illustrated in methods 1~3 (Step S109, S209 and S308), the following processing may be performed as methods 1'~3'. FIG. 13 is a flowchart showing an operation of determining a coding mode using method 1'. As for methods 2' and 3', the descriptions and the diagrams are abbreviated since they are as same as those used for the method 1'.

(Method 1')

The direct mode enable/disable judgment unit 109 instructs the motion compensation coding unit 107 to consider a field coded later (namely a field that is coded at the earliest time after the coding of the current field) as a field located in a position closest to the current field in display order, out of the top field and the bottom field which have the same display order information (Step S110 in FIG. 13).

The motion compensation coding unit 107 then generates predictive image data using the coding mode determined by the direct mode enable/disable judgment unit 109. The following describes respective operations according to the determined coding mode.

(Normal Coding in Temporal Direct Mode)

Figure 2:
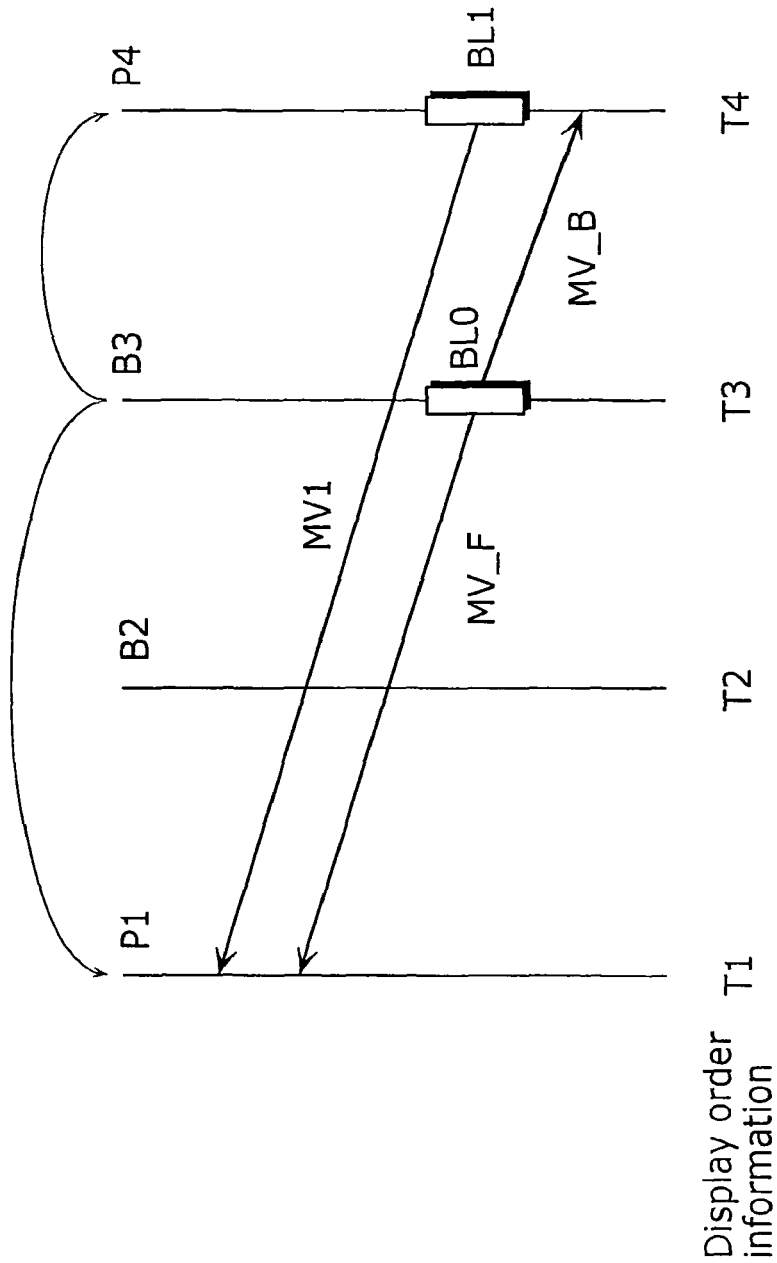
FIG. 2 is a pattern diagram showing a method of estimating and generating motion vectors in temporal direct mode.

In this case, the motion compensation coding unit 107 performs motion compensation using the same method as the temporal direct mode described with reference to FIG. 2 in the Background Art. Namely, the motion compensation coding unit 107 uses a motion vector in a block, co-locating with the current block, in the coded picture, as a reference motion vector, reads out the reference motion vector from the motion vector storage unit 108, performs scaling processing based on the reference motion vector as well as a location relation according to display time between the reference motion vector and the pictures, and then, estimates and generates the motion vectors for the current block. The motion compensation coding unit 107 then performs bi-directional prediction based on the two reference pictures using these motion vectors and generates predictive image data.

(Coding in Temporal Direct Mode Using Motion Vectors Indicating "0")

The motion compensation coding unit 107 does not estimate/generate the motion vectors by performing the scaling processing but generates predictive image data by performing bi-directional prediction based on two reference pictures using motion vectors indicating "0".

The value of the motion vectors used here is not limited to "0" and may be a predetermined value that can be determined regardless of the scaling processing. In the example above, it is explained that both of the two motion vectors corresponding to the two reference pictures indicate "0". However, the present invention is not limited to this and at least one of the motion vectors may indicate "0".

(Coding Using a Mode Other than Direct Mode)

The motion compensation coding unit 107 performs bi-directional prediction based on two reference pictures using the motion vectors estimated by the motion vector estimation unit 106 and generates predictive image data.

(Coding in Spatial Direct Mode)

Figure 3:
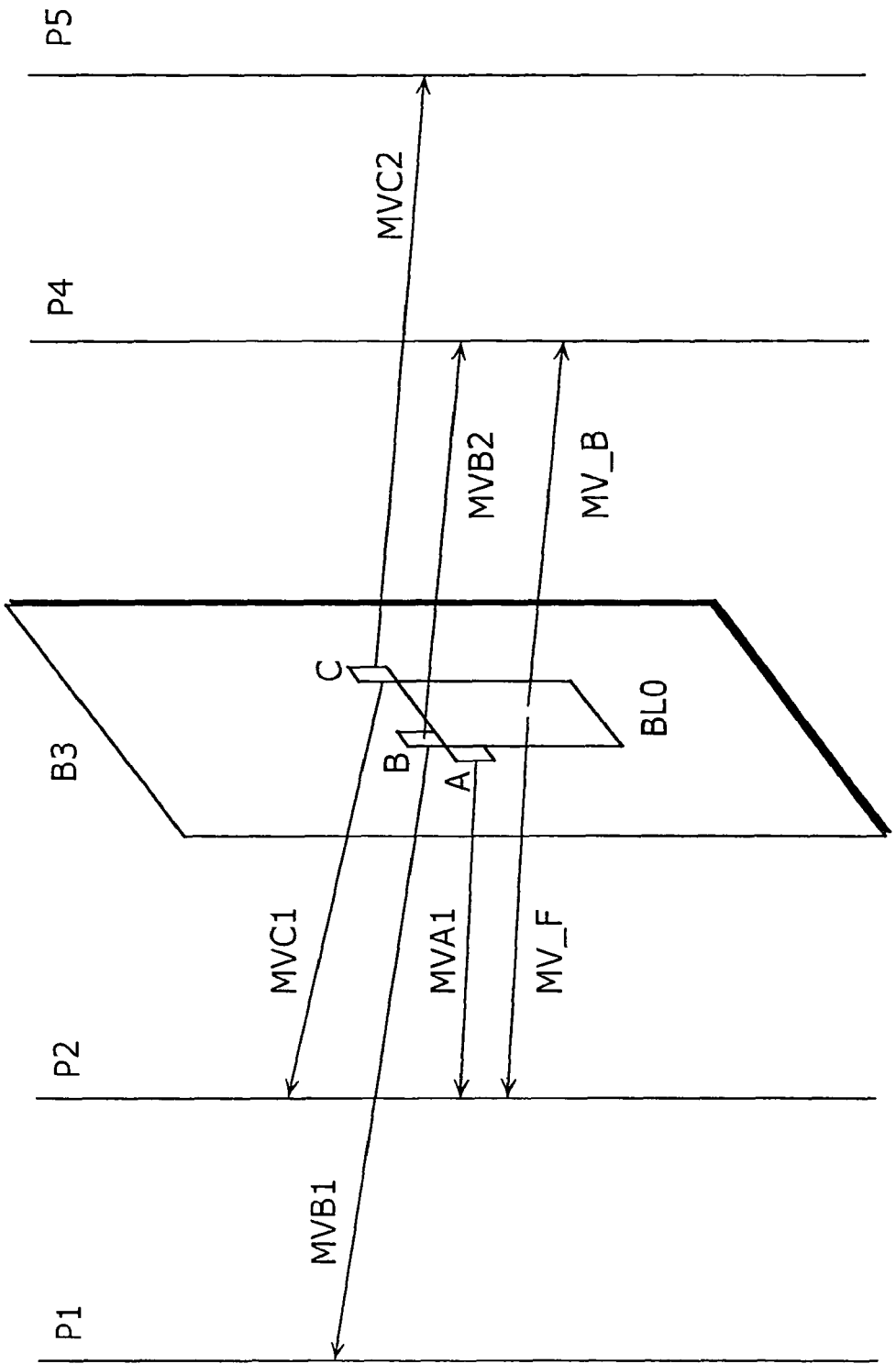
FIG. 3 is a pattern diagram showing a method of estimating and generating motion vectors in spatial direct mode.
Figure 5:
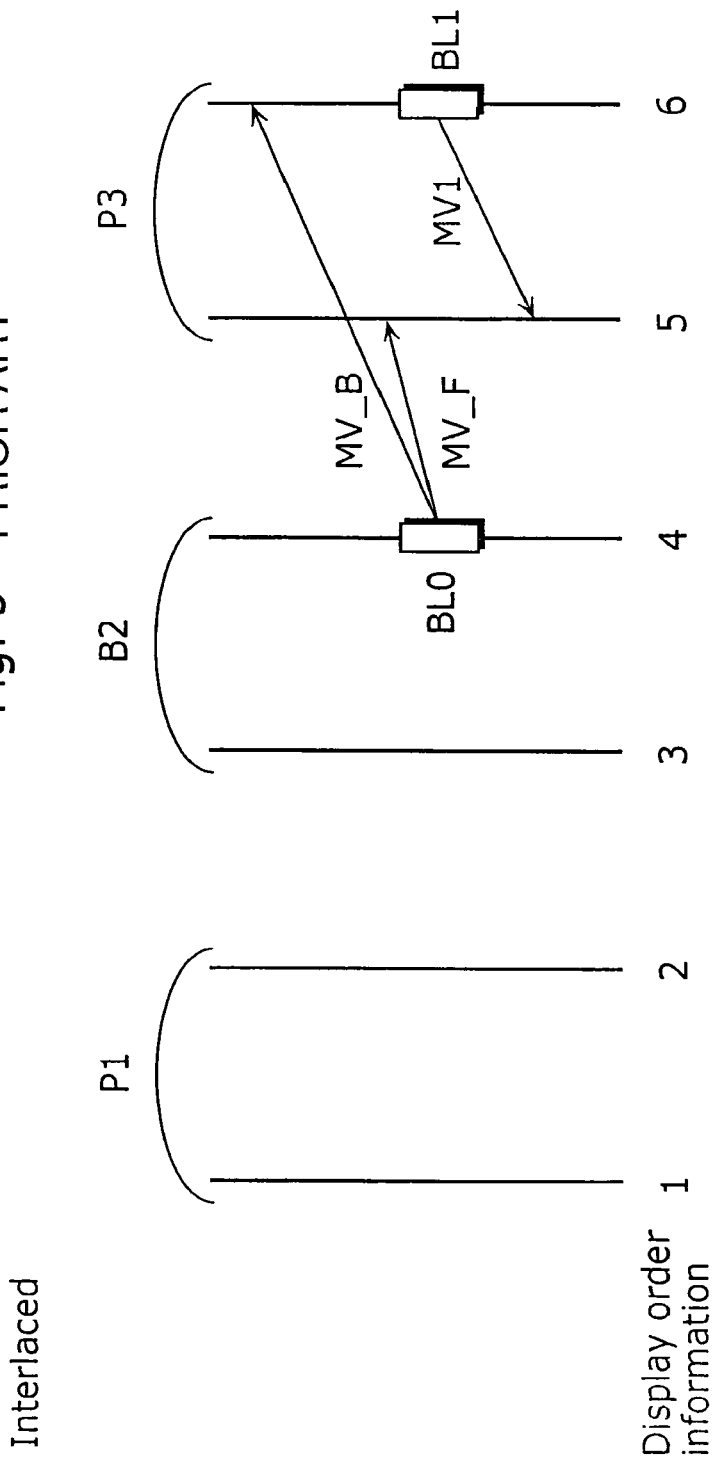
FIG. 5 is a pattern diagram showing a method of estimating and generating motion vectors for coding the interlaced picture in a temporal direct mode.
Figure 6:
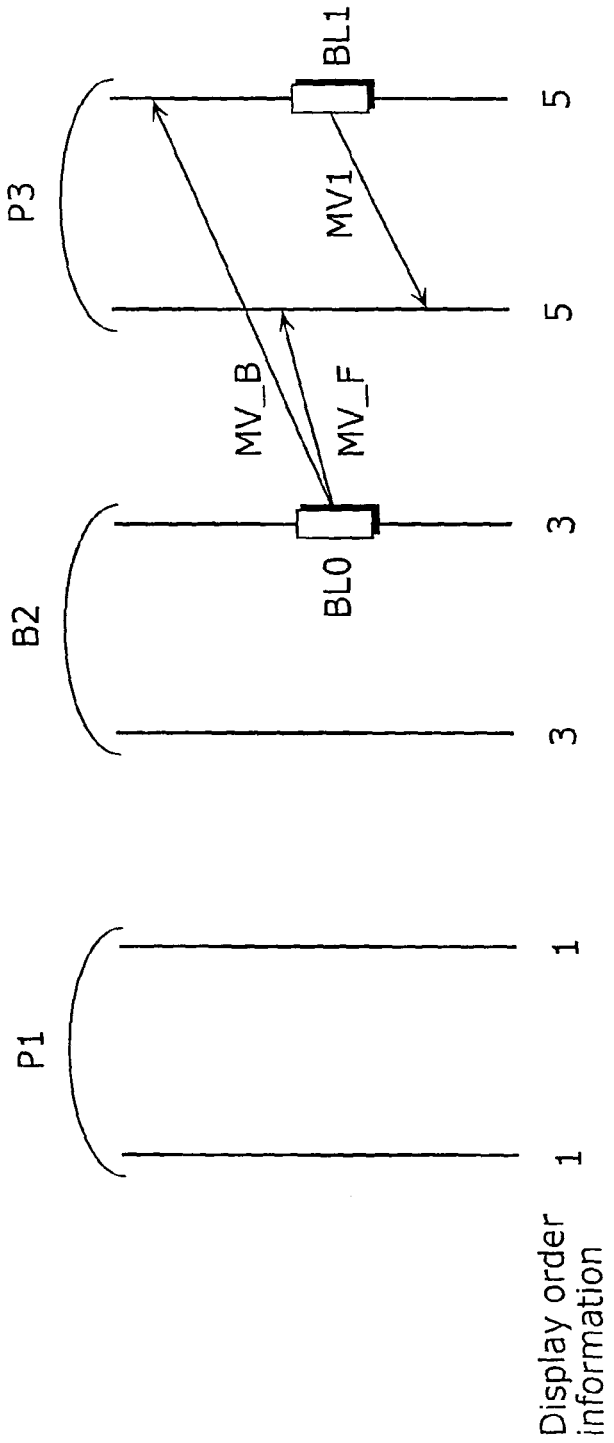
FIG. 6 is a pattern diagram showing a method of estimating and generating motion vectors for coding the progressive picture in the temporal direct mode.

In this case, the motion compensation coding unit 107 performs motion compensation using the same method as in the spatial direct mode described with reference to FIG. 3 in the Background Art. Namely, the motion compensation coding unit 107 estimates and generates the motion vectors used for the current block, using the motion vector which has referred to the coded picture that is located in a position closest to the current picture in display order, out of the respective motion vectors of the three coded blocks respectively including one of three pixels that are located closely to the current block.

Here, when the respective motion vectors of the three blocks described above include a plurality of motion vectors referring to the coded picture that is located in a position closest to the current picture (field) in display order, and also, the plurality of reference pictures belong to the same frame as a top field and a bottom field which have the same display order information, the motion compensation coding unit 107 considers one of the top field and the bottom field as a field located in a position closest to the current field, based on the instruction sent from the direct mode enable/disable judgment unit 109.

Figure 7:
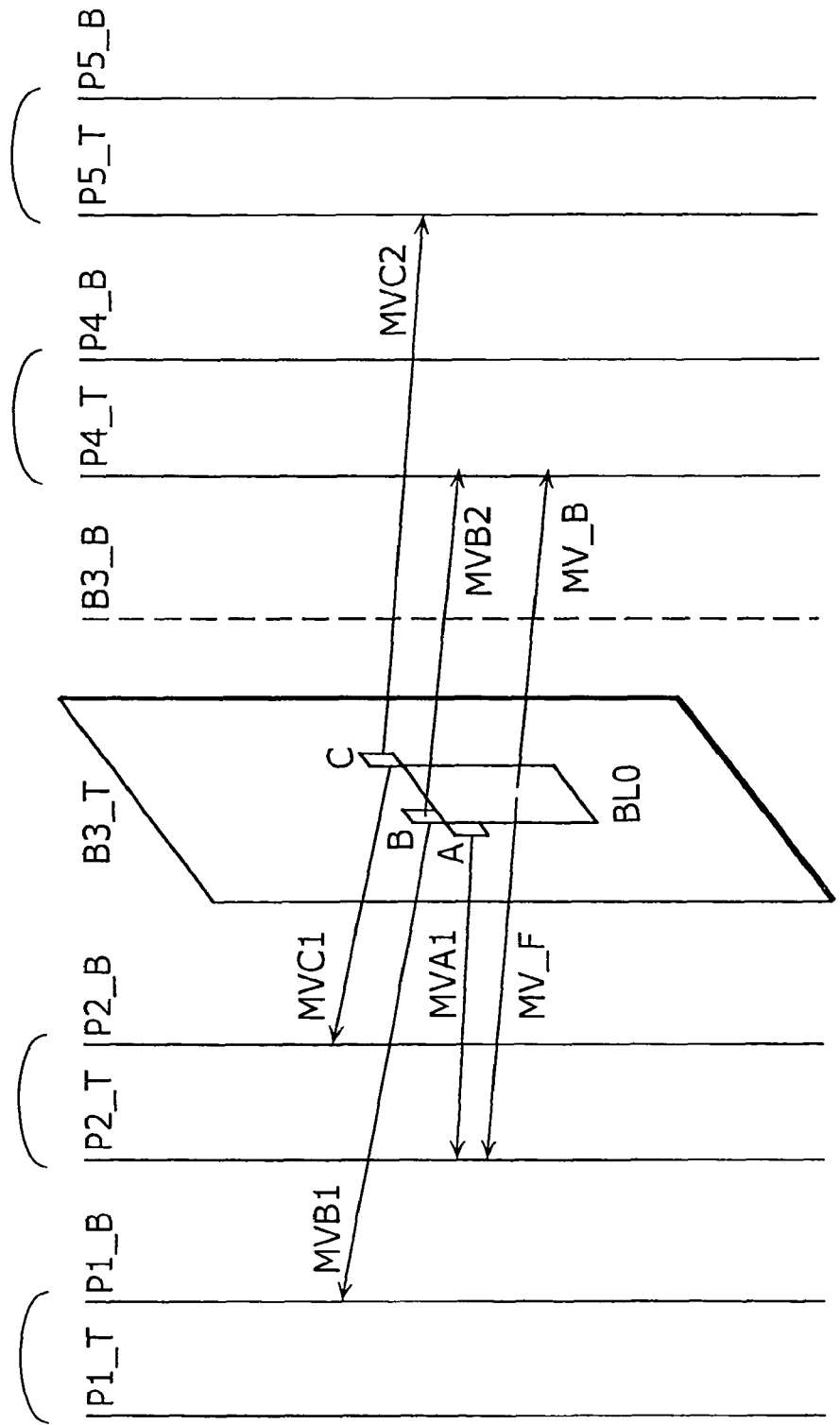
FIG. 7 is a pattern diagram showing a method of estimating and generating motion vectors for coding the progressive picture in a spatial direct mode.

Namely, when the instruction sent from the direct mode enable/disable judgment unit 109 is the one described in methods 1~3 above, the field having the same attribute as the current field is considered to be the field that is located in the position closest to the current field in display order, out of the top field and the bottom field which have the same display order information. For example, in the example shown in FIG. 7, the field P2_T that is a top field as is the case of the current field B3_T is considered to be the field that is located in the position closest to the current field in display order, out of the fields P2_T and P2_B. Therefore, the motion vector MVA1 referring to the field P2_T is determined as a candidate for the first motion vector of the current block.

When the instruction sent from the direct mode enable/disable judgment unit 109 is the one described in methods 1'~3', the field coded later is considered to be the field that is located in the position closest to the current field in display order out of the top field and the bottom field, having the same display order information. For example, in FIG. 7, assuming that the field P2_B out of the fields P2_T and P2_B is coded later, the field P2_B is considered to be the field that is located in the position closest to the current field in display order, out of the fields P2_B and P2_T which have the same display order information. Thus, the motion vector MVC1 referring to the field P2_B is determined as a candidate for the first motion vector MV_F of the current block. The same applies to a case in which MV_B is obtained as the second motion vector.

When three motion vectors are thus determined, the medium value is selected as a motion vector of the current block. When two motion vectors are thus determined, the average value is obtained and considered to be a motion vector of the current block. When a single motion vector is determined (an example shown in FIG. 7), the determined motion vector is obtained as a motion vector of the current block. The motion compensation coding unit 107 performs motion compensation based on the reference pictures using the motion vectors thus obtained and thereby generates predictive image data.

The motion compensation coding unit 107 then outputs the predictive image data generated as above to the subtraction unit 110 and the addition unit 111. When the motion compensation coding unit 107 selects the intra-picture prediction, the predictive image data is not outputted. When the motion compensation coding unit 107 selects the intra-picture prediction, the switch 112 is connected to the side to which the signal is inputted directly from the picture memory 101. When the inter-picture prediction is selected, the switch 112 is controlled to be connected to the side to which the signal is inputted from the subtraction unit 110. The motion compensation coding unit 107 outputs the determined coding mode to the bit stream generation unit 103.

The subtraction unit 110, to which the predictive image data is inputted from the motion compensation coding unit 107, calculates a differential between the predictive image data, and the image data of the macroblock in the picture B11, which is read out from the picture memory 101, generates predictive residual image data and outputs it to the predictive residual coding unit 102.

The predictive residual coding unit 102, to which the predictive residual image data is inputted, performs coding processing such as frequency conversion and quantization, generates coded data and outputs it to the bit stream generation unit 103. The bit stream generation unit 103, to which the coded data is inputted, performs variable length coding or the like for the coded data, generates a bit stream by adding the information on the motion vectors and the coding mode inputted from the motion compensation coding unit 107, and outputs it. As for the macroblock coded in the direct mode, the information on motion vectors is not added to the bit stream.

The subsequent coding processing is performed for the rest of the macroblocks in the picture B11 in the same processing.

Thus, when the field coding is selected and the coding is performed in the temporal direct mode, whether or not the scaling processing can be performed is determined. When it is determined that the scaling processing cannot be performed, the coding mode is changed so that there is no such case in which the coding cannot be performed since the scaling processing cannot be performed.

When the field coding is selected and the coding is performed in the spatial direct mode, whether or not the motion vectors used for the current block can be estimated and generated is determined based on the display order information assigned for the pictures. When it is determined that the motion vectors can neither be estimated nor generated, necessary processing is performed to specify which field out of the top field and the bottom field which have the same display order information, is considered as a field that is located in the position closest to the current field in display order. Therefore, there is not such case in which the motion vectors can neither be estimated nor generated and the coding cannot be performed.

Figure 14:
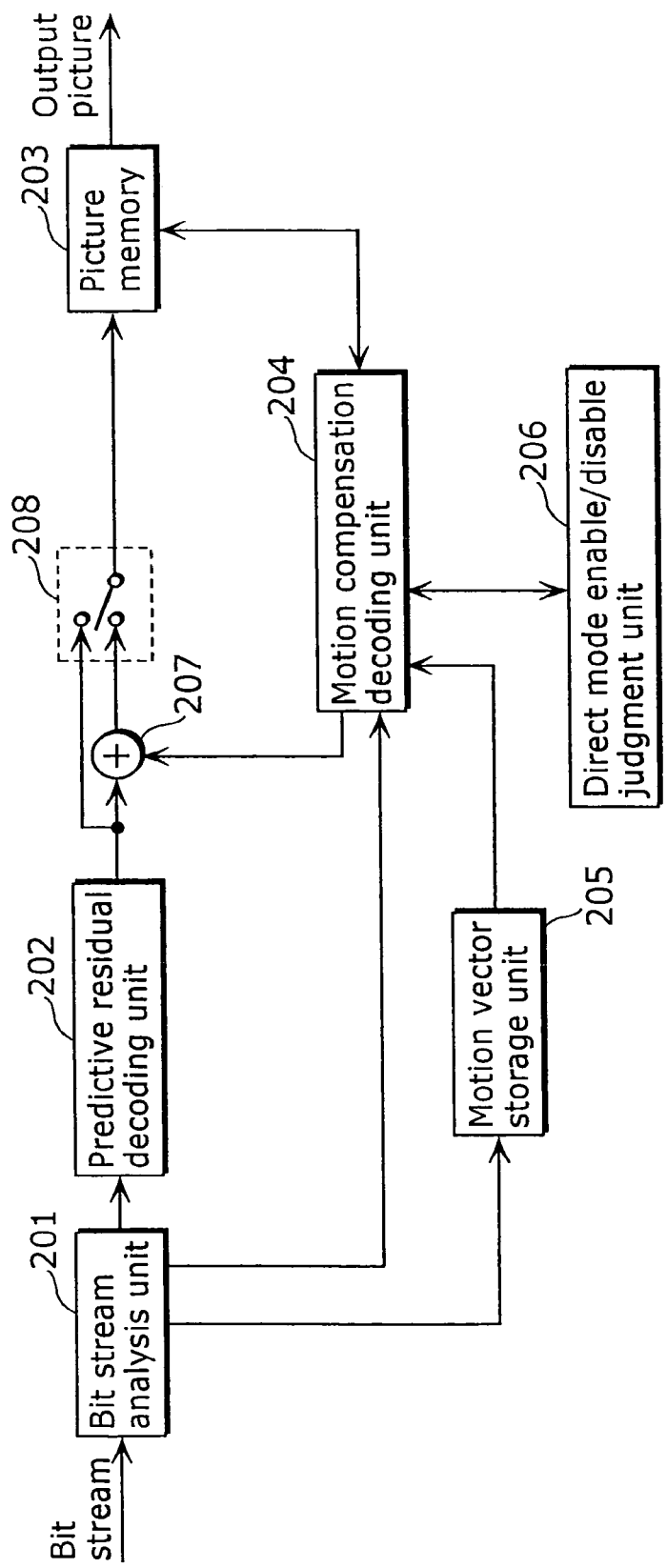
FIG. 14 is a block diagram showing a structure of an embodiment of a moving picture decoding apparatus according to the present invention.

FIG. 14 is a block diagram showing a structure of an embodiment of a moving picture decoding apparatus using the moving picture decoding method according to the present invention.

The moving picture decoding apparatus includes a bit stream analysis unit 201, a predictive residual decoding unit 202, a picture memory 203, a motion compensation decoding unit 204, a motion vector storage unit 205, a direct mode enable/disable judgment unit 206, an addition unit 207 and a switch 208.

The bit stream analysis unit 201 extracts, from the inputted bit stream, various kinds of data such as information on a decoding mode and the motion vectors used at the time of coding. The predictive residual decoding unit 202 decodes the inputted predictive residual data and generates predictive residual image data. The motion compensation decoding unit 204 generates motion compensation image data based on the information on the decoding mode and the motion vectors. The motion vector storage unit 205 stores the motion vectors extracted by the bit stream analysis unit 201.

The direct mode enable/disable judgment unit 206 judges whether or not the scaling processing can be performed and determines a decoding mode, when the decoding mode extracted by the bit stream analysis unit 201 is a temporal direct mode. The direct mode enable/disable judgment unit 206 judges also whether or not the motion vectors used for a current block to be decoded can be estimated and generated, when the decoding mode is a spatial direct mode. The addition unit 207 adds the predictive residual image data inputted from the predictive residual decoding unit 202 to the motion compensation image data inputted from the motion compensation decoding unit 204 and thereby generates decoded image data. The picture memory 203 stores the generated decoded image data.

The following describes an operation of the moving picture decoding apparatus constructed as above. The order of the pictures is explained with reference to FIGS. 9A and 9B. Here, a P-picture is coded using an I-picture or a P-picture located closely to and forward of the current picture in display order, whereas a B-picture is coded using (i) an I-picture or a P-picture located closely to and forward of the current picture in display order, and (ii) an I-picture or a P-picture located closely to and backward of the current picture in display order, as reference pictures.

A bit stream is inputted to the bit stream analysis unit 201 in the picture order as shown in FIG. 9B. The bit stream analysis unit 201 extracts from the inputted bit stream various kinds of information such as information on the decoding mode and the motion vectors. The bit stream analysis unit 201 outputs respectively the extracted information on the decoding mode to the motion compensation decoding unit 204 and the information on the motion vectors to the motion vector storage unit 205.

The bit stream analysis unit 201 also outputs the extracted coded predictive residual data to the predictive residual decoding unit 202. The predictive residual decoding unit 202, to which the coded predictive residual data is inputted, performs decoding of the coded predictive residual data, generates predictive residual image data and outputs it to the addition unit 207.

As for the subsequent operation, a case in which the current picture to be decoded is a B-picture and the decoding mode extracted by the bit stream analysis 201 is the direct mode is described.

The motion compensation decoding unit 204, to which the information on the decoding mode is inputted by the bit stream analysis unit 201, judges whether or not a current block to be decoded is decoded in the direct mode and notifies the direct mode enable/disable judgment unit 206 of it when the decoding is performed in the direct mode.

The following describes an operation of the determination of the decoding mode performed by the direct mode enable/disable judgment unit 206 when the decoding mode is the direct mode. The operation for the determination of the decoding mode can be performed using any of methods 1~3 described below.

(Method 1)

Figure 15:
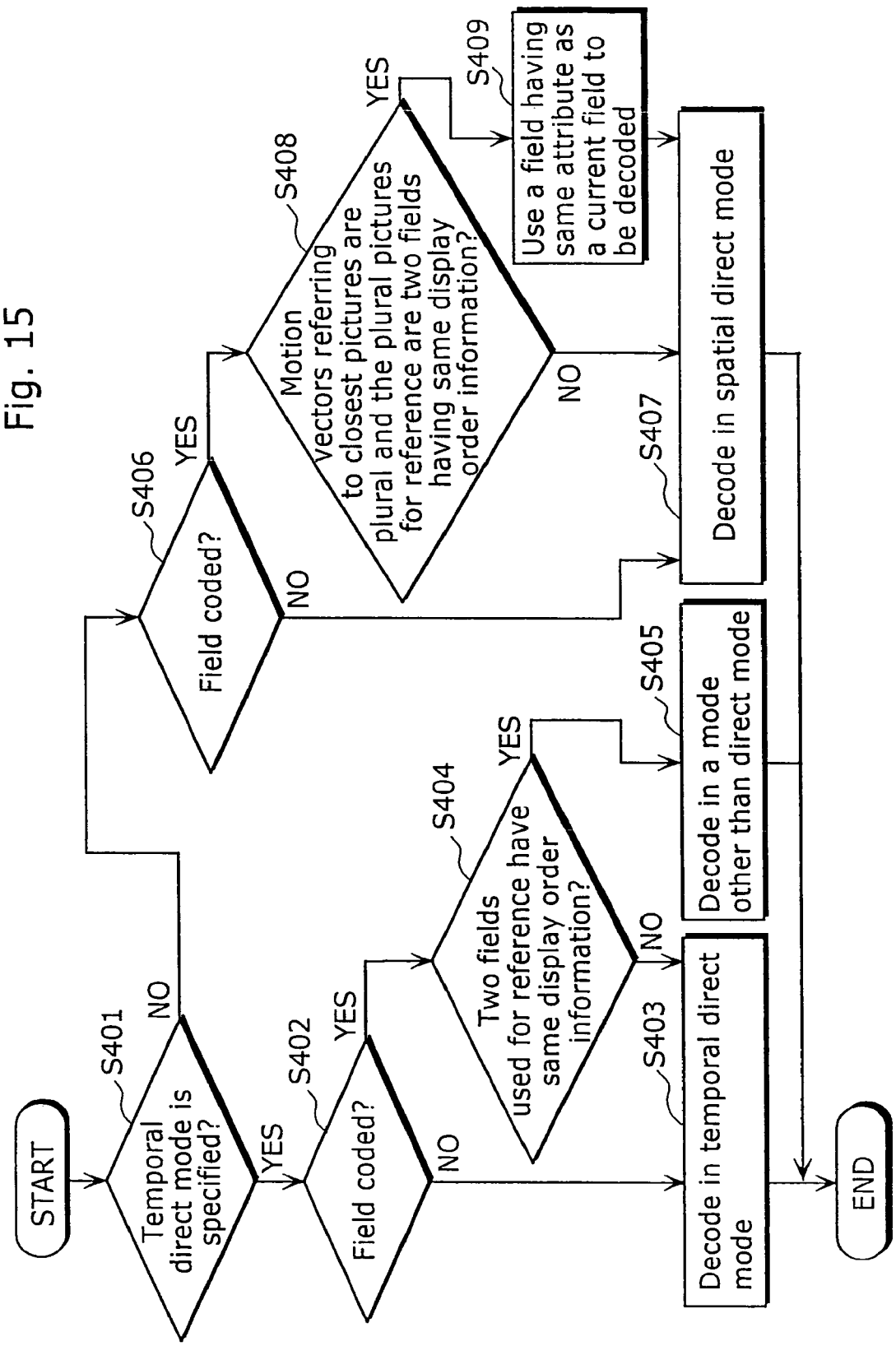
FIG. 15 is a flowchart showing an operation of determining a decoding mode using method 1 employed by the direct mode enable/disable judgment unit.

FIG. 15 is a flowchart showing an operation of determining a decoding mode using method 1. The direct mode enable/disable judgment unit 206 firstly judges whether or not a temporal direct mode is specified (Step S401). When it is judged that the temporal direct mode is specified, the direct mode enable/disable judgment unit 206 judges whether or not a field coding is performed (Step S402). When it is judged that the field coding is not performed, the direct mode enable/disable unit 206 instructs the motion compensation decoding unit 204 to perform decoding in the temporal direct mode (Step S403). On the other hand, when it is judged that the field coding is performed, the direct mode enable/disable judgment unit 206 judges whether or not the motion vectors used for the current block can be estimated and generated by performing the scaling processing (Step S404). Namely, it is to judge whether or not the two reference pictures belong to the same frame as a top field and a bottom field which have the same display order information. When the scaling processing can be performed (NO in the judgment of the condition in Step S404), the direct mode enable/disable judgment unit 206 instructs the motion compensation decoding unit 204 to perform decoding in the temporal direct mode (Step S403). On the other hand, when the scaling processing cannot be performed (YES in the judgment of the condition in Step S404), the direct mode enable/disable judgment unit 206 instructs the motion compensation decoding unit 204 to perform decoding using a mode other than the direct mode (Step S405).

As a result of the determination described above (Step S401), even when it is judged that the temporal direct mode is not used (namely a spatial direct mode is selected), the direct mode enable/disable judgment unit 206 judges whether or not field coding is performed (Step S406). When it is judged that the field coding is not performed, the direct mode enable/disable judgment unit 206 instructs the motion compensation unit 204 to perform decoding in the spatial direct mode (Step S407).

As a result of the determination described above (Step S406), when it is judged that the field coding is selected, the direct mode enable/disable judgment unit 206 judges whether or not the motion vectors used for the current block can be estimated and generated in the spatial direct mode, based on the display order information assigned for the pictures (Step S408). Namely, it is to judge whether or not respective three decoded blocks respectively including one of three pixels that are located closely to the current block include a plurality of motion vectors referring to the decoded picture that is located in the position closest to the current picture (field) in display order and whether or not the plurality of reference pictures belong to the same frame as a top field and a bottom field which have the same display order information. When the above conditions are satisfied, it is judged that the motion vectors can neither be estimated nor generated.

As a result of the determination as described above (Step S408), when it is judged that the motion vectors can be estimated and generated (NO in the judgment of the conditions in Step S408), the direct mode enable/disable judgment unit 206 instructs the motion compensation decoding unit 204 to perform decoding in the spatial direct mode (Step S407).

On the other hand, when it is judged that the motion vectors can neither be estimated nor generated (YES in the judgment of the conditions in Step S408), the direct mode enable/disable judgment unit 206 instructs the motion compensation decoding unit 204 to consider a field having the same attribute as the current block to be a field that is located in a position closest to the current field in display order, out of the top field and the bottom field which have the same display order information (Step S409). Here, the field having the same attribute means a top field when the current field is a top field and a bottom field when the current field is a bottom field. Taking this into consideration, the direct mode enable/disable judgment unit 206 instructs the motion compensation decoding unit 204 to perform decoding in the spatial direct mode (Step S407).

(Method 2)

Figure 16:
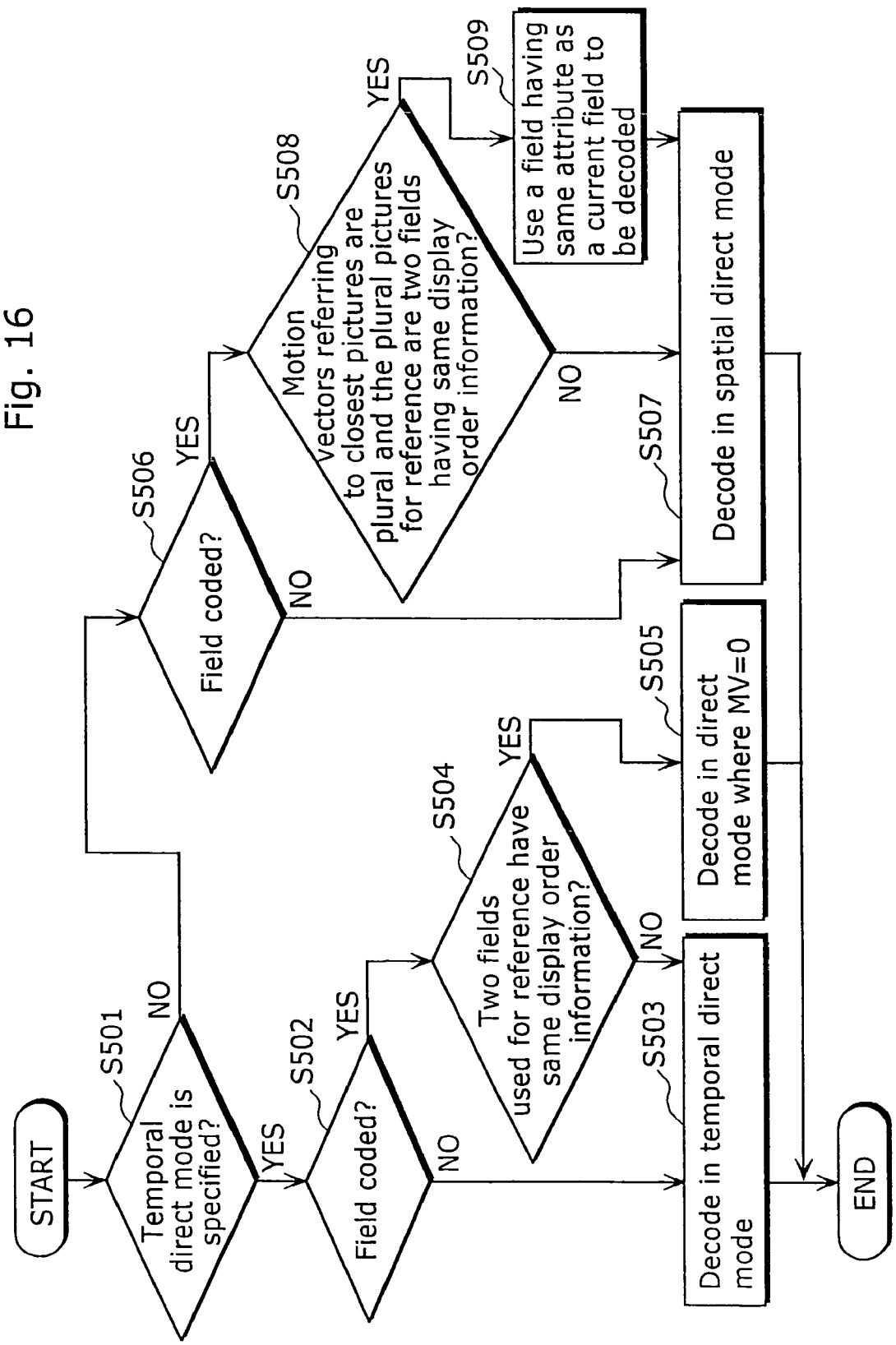
FIG. 16 is a flowchart showing an operation of determining a decoding mode using method 2 employed by the direct mode enable/disable judgment unit.

FIG. 16 is a flowchart showing an operation of determining a decoding mode using method 2. The processing except for the process performed in the case in which it is judged that the field coding is selected and judges that the scaling processing cannot be performed (Steps S501~504, S506~509) is abbreviated since it is the same as the one described in method 1.

When it is judged that the field coding is selected and the scaling processing cannot be performed, the direct mode enable/disable judgment unit 206 instructs the motion compensation decoding unit 204 to perform decoding in the temporal direct mode using motion vectors indicating "0" (Step S505).

(Method 3)

Figure 17:
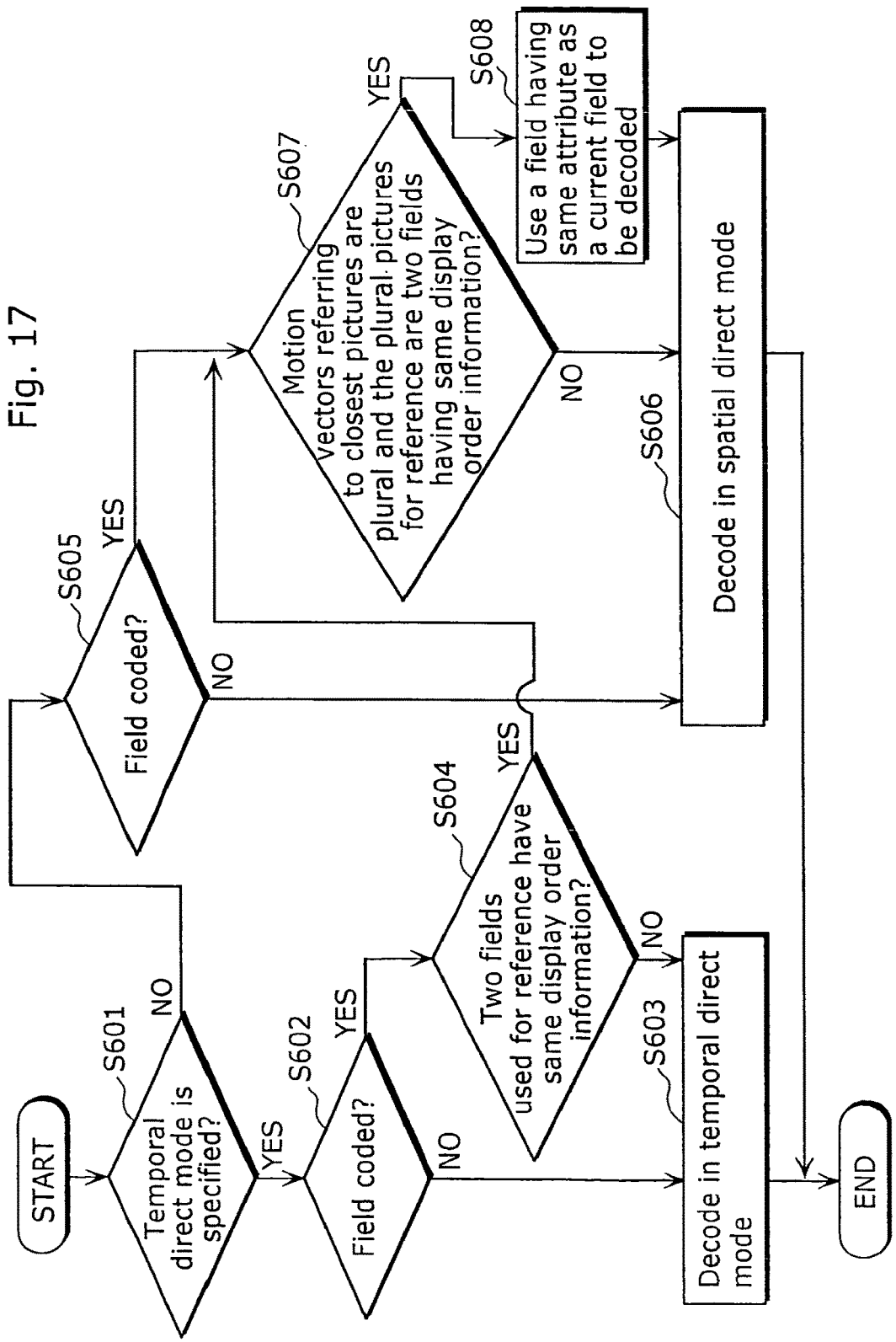
FIG. 17 is a flowchart showing an operation of determining a decoding mode using method 3 employed by the direct mode enable/disable judgment unit.

FIG. 17 is a flowchart showing an operation of determining a decoding mode using method 3. The processing except for the processing performed in the case in which it is judged that the field coding is selected and judged that the scaling processing cannot be performed (Step S601~S606, S608) is abbreviated since it is same as the one described in the method 1.

When it is judged that the field coding is selected and the scaling processing cannot be performed, the direct mode enable/disable judgment unit 206 judges whether or not the motion vectors used for the current block can be estimated and generated in the spatial direct mode (Step S607). The subsequent operation is as same as the one described in method 1.

Figure 18:
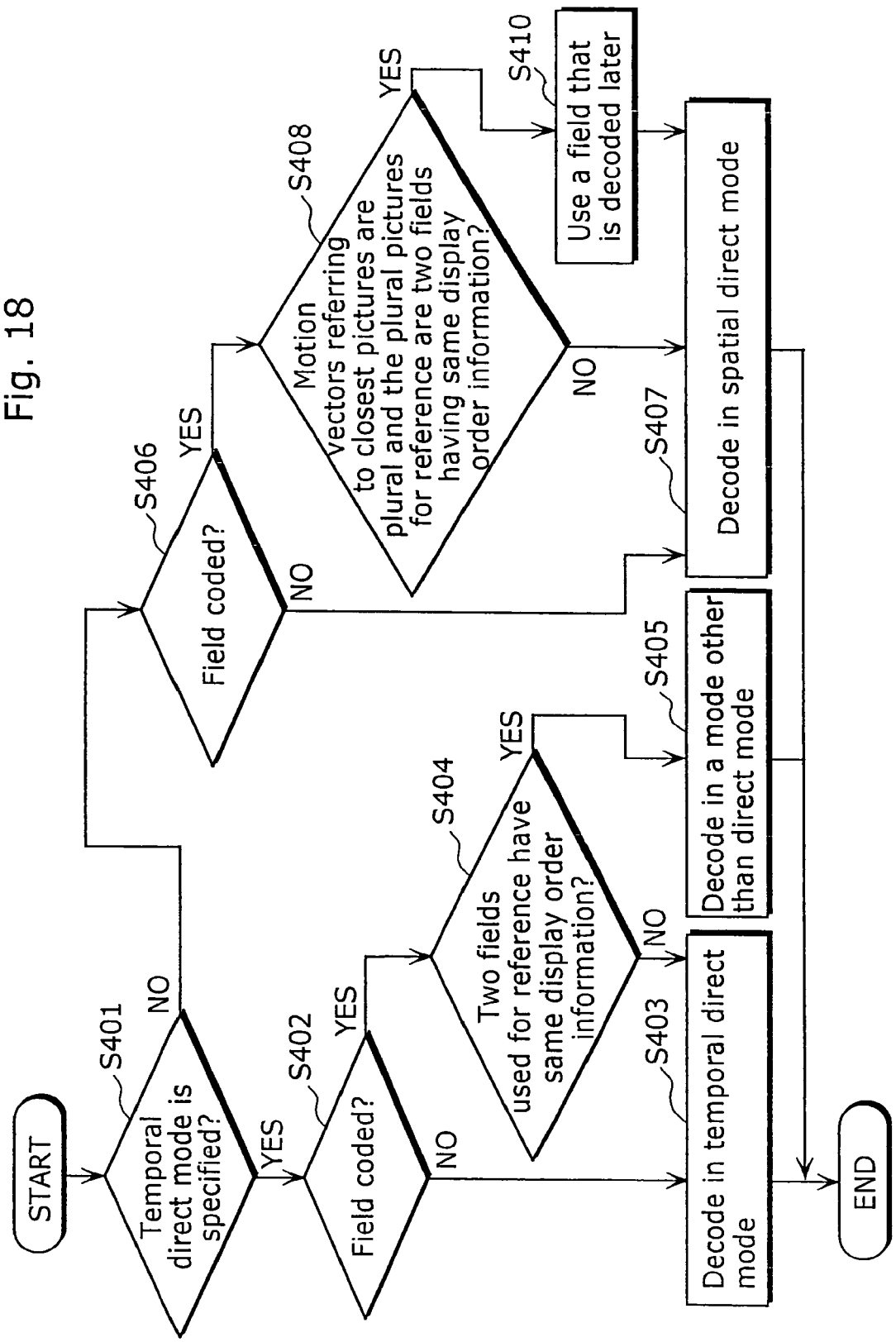
FIG. 18 is a flowchart showing an operation of determining a decoding mode using method 3 employed by the direct mode enable/disable judgment unit.

As for the processing described above for the case in which it is judged that the motion vectors can neither be estimated nor generated in the spatial direct mode (Step S409, S509, S608) described in methods 1~3 above, the following processing can be performed as methods 1'~3'. FIG. 18 is a flowchart showing an operation of determining a decoding mode using the method 1'. As for the methods 2' and 3', the descriptions and the diagrams are abbreviated since they are as same as those used for the method 1'.

(Method 1')

The direct mode enable/disable judgment unit 206 instructs the motion compensation decoding unit 204 to consider a field that is decoded at a later time (namely a field decoded at the earliest time after the decoding of the current field) as a field located in a position closest to the current field in display order, out of the top field and the bottom field which have the same display order information (Step S410 in FIG. 18).

The motion compensation decoding unit 204 then generates motion compensation image data using the decoding mode determined by the direct mode enable/disable judgment unit 206. The following describes the respective operations according to the determined decoding mode.

(Normal Decoding in Temporal Direct Mode)

In this case, the motion compensation decoding unit 204 performs motion compensation using the same method as in the temporal direct mode explained with reference to FIG. 2 in the Background Art. Namely, the motion compensation decoding unit 204 uses a motion vector of a block co-locating with the current block, out of the decoded reference pictures, as a reference motion vector. Namely, the motion compensation decoding unit 204 reads out the reference motion vector from the motion vector storage unit 205 and estimates/generates the motion vectors used for the current block by performing the scaling processing based on a location relation according to display time between the reference motion vector and the pictures. The motion compensation decoding unit 204 then performs bi-directional prediction based on the two reference pictures using these motion vectors and generates motion compensation image data.

(Decoding in Temporal Direct Mode Using Motion Vectors Indicating "0")

The motion compensation decoding unit 204 does not estimate/generate the motion vectors by performing the scaling processing but generates predictive image data by performing bi-directional prediction based on the two reference pictures using motion vectors indicating "0".

The value of the motion vector used here is not limited to "0" and may be a predetermined value that can be determined without requiring the scaling processing. In the example above, it is explained that both of the motion vectors corresponding to the two reference pictures indicate "0", however, the present invention is not limited to this and at least one of the motion vectors may indicate "0".

(Decoding Using a Mode Other than Direct Mode)

The motion compensation decoding unit 204 reads out the motion vectors used at the time of coding from the motion vector storage unit 205, and generates motion compensation image data by performing bi-directional prediction based on the two reference pictures using these motion vectors. (Decoding in spatial direct mode)

The motion compensation decoding unit 204 performs motion compensation using the same method as in the spatial direct mode explained with reference to FIG. 3 in the Background Art. Namely, the motion compensation decoding unit 204 estimates and generates the motion vectors used for the current block, using the motion vector which has referred to the decoded picture that is located in a position closest to the current picture as a motion vector of the current block, out of the respective motion vectors of the three decoded blocks respectively including one of three pixels that are located closely to the current block.

In this case, when the respective three blocks described above include a plurality of motion vectors referring to the decoded picture that is located in the position closest to the current picture (field) in display order and the plurality of the reference pictures belong to the same frame as a top field and a bottom field which have the same display order information, the motion compensation decoding unit 204 considers either of the top field and the bottom field as a field located in a position closest to the current field in display order, based on the instruction sent from the direct mode enable/disable judgment unit 206.

Namely, when the instruction sent from the direct mode enable/disable judgment unit 206 is the one described in the above methods 1~3, a field having the same attribute as the current field is considered to be the field that is located in the position closest to the current field in display order, out of the top field and the bottom field which have the same display order information. For example, in the example shown in FIG. 7, the field P2_T that is a top field as is the current field B3_T, is considered to be the field located in the position closest to the current field in display order, out of the fields P2_T and P2_B which have the same display order information. Therefore, the motion vector MVA1 referring to the field P2_T is determined as a candidate for the first motion vector of the current block.

When the instruction sent from the direct mode enable/disable judgment unit 206 is the one described in methods 1'~3', a field decoded at later time is considered to be the field located in the position closest to the current field in display order, out of the top field and the bottom field which have the same display order information. For example, assuming that the field P2_B is decoded later out of the fields P2_T and P2_B in the example shown in FIG. 7, the field P2_B that is decoded later is determined as the field located in the position closest to the current field in display order, out of the fields P2_T and P2_B. Consequently, the motion vector MVC1 referring to the field P2_B is determined as a candidate for the first motion vector MV_F of the current block. The same applies to a case in which the second motion vector MV_B is obtained.

When three motion vectors are thus determined, a medium value of the three is selected as a motion vector of the current block. When two motion vectors are determined, an average value of the two is obtained and regarded as a motion vector of the current block. When only one motion vector is determined (an example shown in FIG. 7), the determined motion vector is considered to be a motion vector of the current block. The motion compensation decoding unit 204 performs motion compensation based on the reference pictures and generates motion compensation image data, using the motion vectors thus obtained.

The motion compensation decoding unit 204 then outputs the motion compensation image data (block) generated as above to the addition unit 207. The addition unit 207 adds the motion compensation image data to the predictive residual image data inputted from the predictive residual decoding unit 202, generates decoded image data and stores it in the picture memory 203.

The subsequent decoding processing for the rest of the macroblocks in the picture B11 is performed in the same processing as described above. In the example shown in FIG. 9B, when processing is performed for all the macroblocks in the picture B11, the decoding processing of the picture B12 follows. The pictures thus decoded are outputted one by one from the picture memory 203 as shown in FIG. 9A.

Thus, when the field coding is selected and the decoding mode extracted is the temporal direct mode, whether or not the scaling processing can be performed is judged. When it is judged that the scaling processing cannot be performed, the processing such as a changing of the decoding mode is operated. Therefore, there is no such case in which the decoding cannot be performed since the scaling processing cannot be performed.

When the field coding is selected and the decoding mode extracted is the spatial direct mode, whether or not the motion vectors used for the current block can be estimated and generated based on the display order information assigned for the pictures is judged. When it is judged that the motion vectors can neither be estimated nor generated, the processing is performed to specify which of the top field and the bottom field, having the same display order information, is considered as a field located in the position closest to the current field in display order. Therefore, there is no such case in which the motion vectors can neither be estimated nor generated.

In the present embodiment, when the picture is coded in the spatial direct mode, the motion compensation coding unit 107 determines a motion vector, which has referred to the coded picture that is located in the position closest to a current picture to be coded in display order, as a candidate for a motion vector of a current block to be coded, when determining a candidate for a motion vector of the current block out of the respective motion vectors of the three coded blocks respectively including one of three pixels that are located closely to the current block. However, the present invention is not limited to this. For example, when field coding is performed, the motion vector which has referred to the field located in the position closest to the current field in display order can be determined to be a candidate, out of the fields having the same attribute as the current field. In this case, a candidate is determined by prioritizing the fact that the field has the same attribute as the current field whereas in the present embodiment, the candidate is determined based on the display order information. The same applies to the operation for the decoding performed by the motion compensation decoding unit 204.

In the present embodiment, it is explained that each picture is coded/decoded adaptively using either the frame structure or the field structure. Even when the picture is coded/decoded adaptively using either of them on a block-by-block basis, the same processing can be performed in the same manner as described in the present invention and the same effects can be obtained.

In the present embodiment, it is explained that the P-picture is processed by referring to the pictures only forwardly in one direction, whereas the B-picture is processed by referring to the pictures in two directions both forwardly and backwardly. However, the same effects can be obtained even when the P-picture is processed by referring to the pictures backwardly in one direction and the B-picture is processed by referring to the pictures forwardly in two directions or backwardly in two directions.

The display order information according to the embodiment of the present invention is not limited to an order of display and it may be an order based on an actual display time or a relative order of each picture based on a predetermined picture whose value increases as the value indicating display time increases.

Second Embodiment

Furthermore, the processing shown in the first embodiment can be carried out easily in an independent computer system by recording the program for realizing the picture coding/decoding method described in the first embodiment onto a storage medium such as a flexible disk or the like.

Figure 19A:
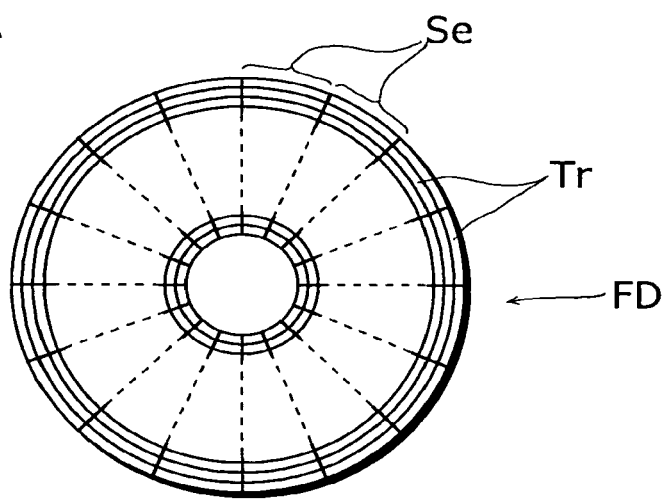
FIGS. 19A, 19B and 19C are illustrations showing a storage medium for storing a program for realizing the moving picture coding method and the moving picture decoding method according to the first embodiment.
Figure 19B:
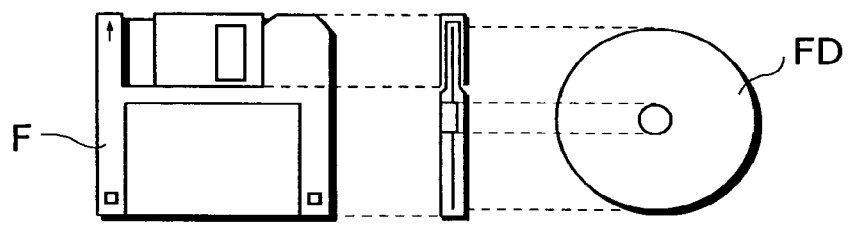
Figure 19C:
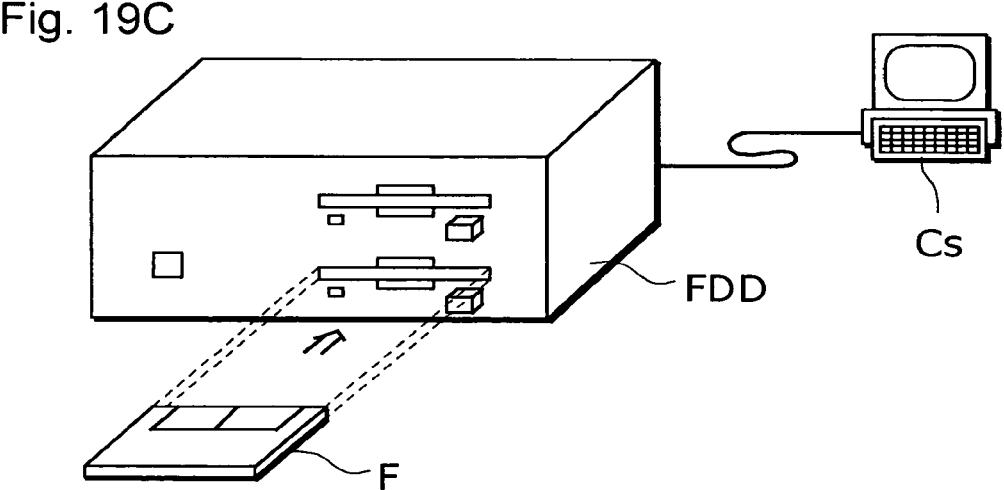

FIGS. 19A~19C are illustrations for carrying out the coding/decoding method described in the above embodiment in the computer system using the program recorded onto the storage medium such as a flexible disk or the like.

FIG. 19B shows a full appearance of a flexible disk, its structure at cross section and the flexible disk itself whereas FIG. 19A shows an example of a physical format of the flexible disk as a main body of a storage medium. A flexible disk FD is contained in a case F with a plurality of tracks Tr formed concentrically from the periphery to the inside on the surface of the disk, and each track is divided into 16 sectors Se in the angular direction. Thus, the program is stored in an area assigned for it on the flexible disk FD.

FIG. 19C shows a structure for recording and reading out the program on the flexible disk FD. When the program is recorded on the flexible disk FD, the computer system Cs writes in the program via a flexible disk drive. When the coding apparatus and the decoding apparatus are constructed in the computer system using the program on the flexible disk, the program is read out from the flexible disk and then transferred to the computer system by the flexible disk drive.

The above explanation is made on an assumption that a storage medium is a flexible disk, but the same processing can also be performed using an optical disk. In addition, the storage medium is not limited to a flexible disk and an optical disk, but any other medium such as an IC card and a ROM cassette capable of recording a program can be used.

The following is a description for the applications of the picture coding/decoding method illustrated in the above-mentioned embodiment and a system using them.

Figure 20:
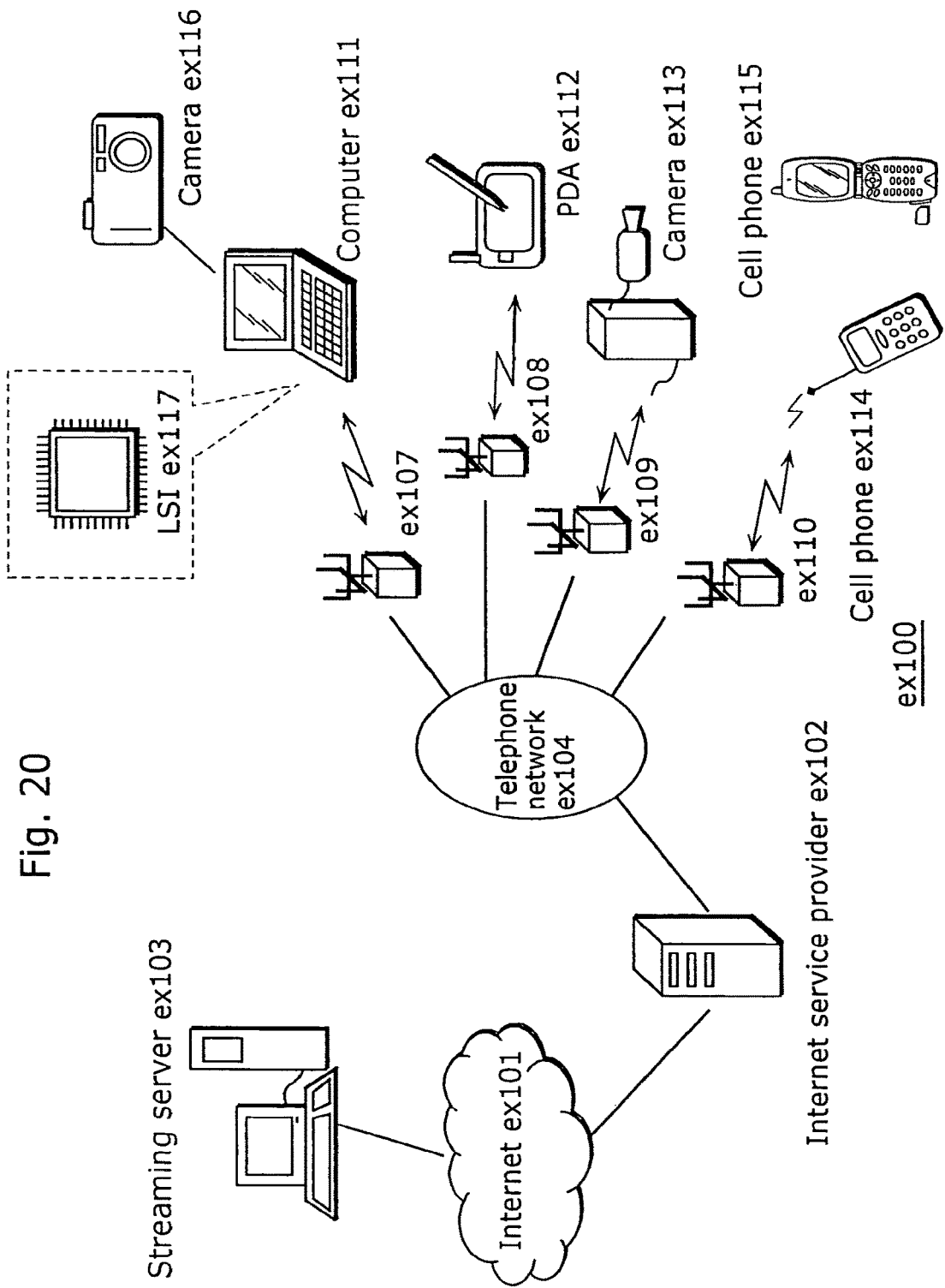
FIG. 20 is a block diagram showing a whole structure of a content supply system for realizing content distribution service.

FIG. 20 is a block diagram showing an overall configuration of a content supply system ex100 for realizing content delivery service. The area for providing communication service is divided into cells of desired size, and cell sites ex107~ex110, which are fixed wireless stations, are placed in respective cells.

This content supply system ex100 is connected to apparatuses such as a computer ex111, a PDA (Personal Digital Assistant) ex112, a camera ex113, a cell phone ex114 and a cell phone with a camera ex115 via, for example, the Internet ex101, an Internet service provider ex102, a telephone network ex104, as well as the cell sites ex107~ex110.

However, the content supply system ex100 is not limited to the configuration shown in FIG. 20 and may be connected to a combination of any of them. Also, each apparatus may be connected directly to the telephone network ex104, not through the cell sites ex107~ex110.

The camera ex113 is an apparatus capable of shooting video such as a digital video camera. The cell phone ex114 may be a cell phone of any of the following system: a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ex111. In this case, either the camera ex116 or the computer ex111 may code the moving picture data. An LSI ex117 included in the computer ex111 and the camera ex116 performs the coding processing. Software for coding and decoding pictures may be integrated into any type of storage medium (such as a CD-ROM, a flexible disk and a hard disk) that is a recording medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiment and transmits them to the streaming server ex103, while the streaming server ex103 makes stream delivery of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the picture coding apparatus or the picture decoding apparatus shown in the above-mentioned embodiment can be used.

A cell phone will be explained as an example of such apparatus.

Figure 21:
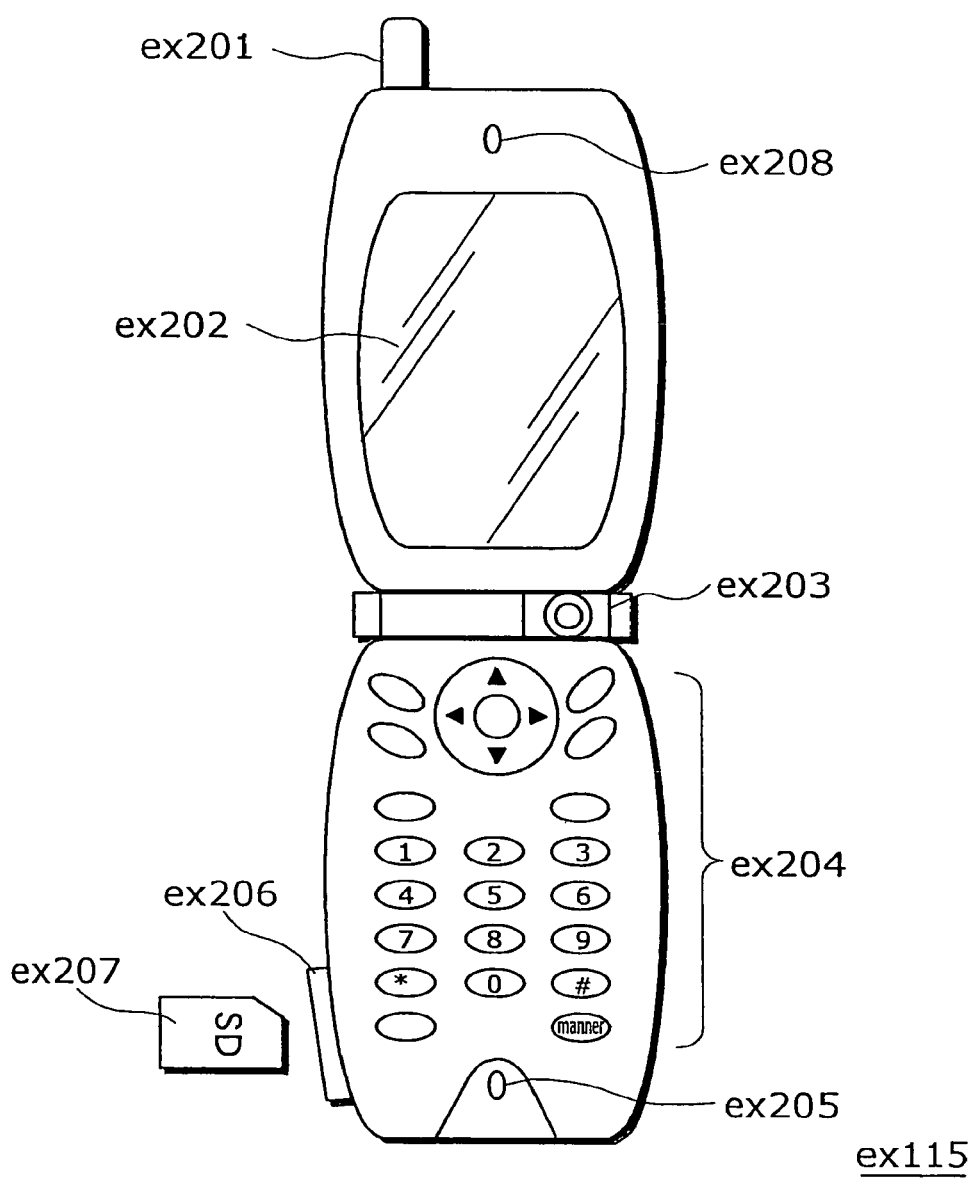
FIG. 21 is a diagram showing an example of a cell phone.

FIG. 21 is a diagram showing the cell phone ex115 using the picture coding/decoding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, an audio output unit ex208 such as a speaker for outputting audio, an audio input unit ex205 such as a microphone for inputting audio, a storage medium ex207 for storing coded or decoded data such as data of moving or still pictures shot by the camera, data of received e-mails and that of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is a nonvolatile memory electrically erasable from and rewritable to a plastic case such as an SD card.

Next, the cell phone ex115 will be explained with reference to FIG. 22. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a read/write unit ex307, a modem circuit unit ex306 and an audio processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing for the digital audio data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the audio processing unit ex305 converts it into analog audio data so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as described in the present invention, compresses and codes the picture data supplied from the camera unit ex203 using the coding method employed by the picture coding apparatus as shown in the first embodiment so as to transform it into coded image data, and sends it out to the multiplexing/demultiplexing unit ex308. At this time, the cell phone ex115 sends out the audio received by the audio input unit ex205 during the shooting with the camera unit ex203 to the multiplexing/demultiplexing unit ex308 as digital audio data via the audio processing unit ex305.

The multiplexing/demultiplexing unit ex308 multiplexes the coded image data supplied from the picture coding unit ex312 and the audio data supplied from the audio processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a coded stream of image data and that of audio data, and supplies the coded image data to the picture decoding unit ex309 and the audio data to the audio processing unit ex305, respectively via the synchronous bus ex313.

Next, the picture decoding unit ex309, including the picture decoding apparatus as described in the present invention, decodes the coded stream of the image data using the decoding method corresponding to the coding method as shown in the above-mentioned embodiments to generate reproduced moving picture data, and supplies this data to the display unit ex202 via the LCD control unit ex302, and thus the image data included in the moving picture file linked to a Web page, for instance, is displayed. At the same time, the audio processing unit ex305 converts the audio data into analog audio data, and supplies this data to the audio output unit ex208, and thus the audio data included in the moving picture file linked to a Web page, for instance, is reproduced.

Figure 23:
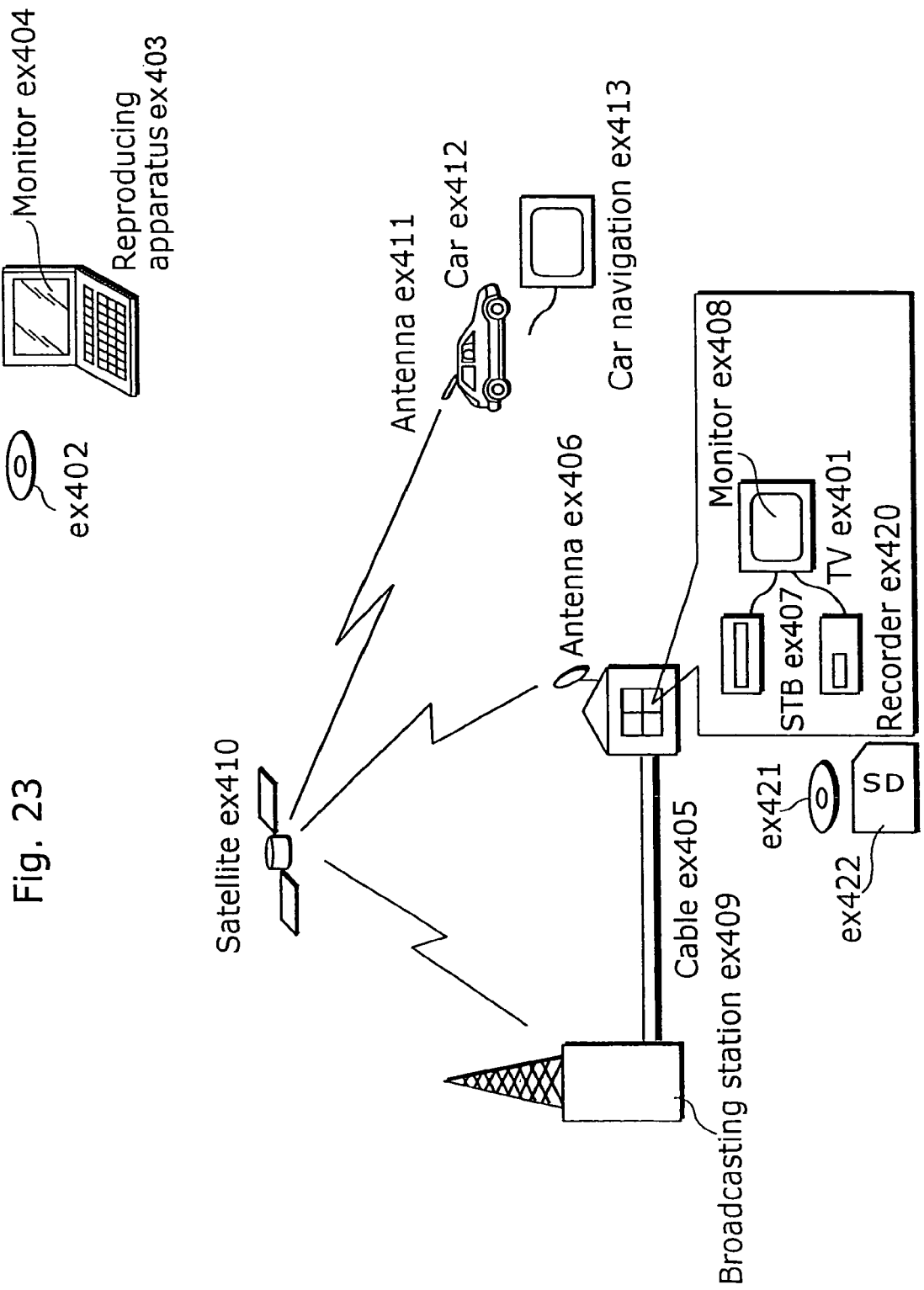
FIG. 23 is block diagram showing a whole structure of a digital broadcasting system.

The present invention is not limited to the above-mentioned system since ground-based or satellite digital broadcasting has been in the news lately and at least either the picture coding apparatus or the picture decoding apparatus described in the above-mentioned embodiment can be incorporated into a digital broadcasting system as shown in FIG. 23. More specifically, a coded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes a coded bit stream for reproduction. The picture decoding apparatus as shown in the above-mentioned embodiment can be implemented in the reproducing apparatus ex403 for reading out and decoding the coded stream recorded on a storage medium ex402 that is a recording medium such as a CD and a DVD. In this case, the reproduced moving picture signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Also, a car ex412 having an antenna ex411 can receive signals from the satellite ex410 or the cell site ex107 for replaying moving picture on a display device such as a car navigation system ex413 set in the car ex412.

Furthermore, the picture coding apparatus as shown in the above-mentioned embodiment can code picture signals and record them on the storage medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the picture decoding apparatus as shown in the above-mentioned embodiment, the picture signals recorded on the DVD disk ex421 or the SD card ex422 can be reproduced for display on the monitor ex408.

Figure 22:
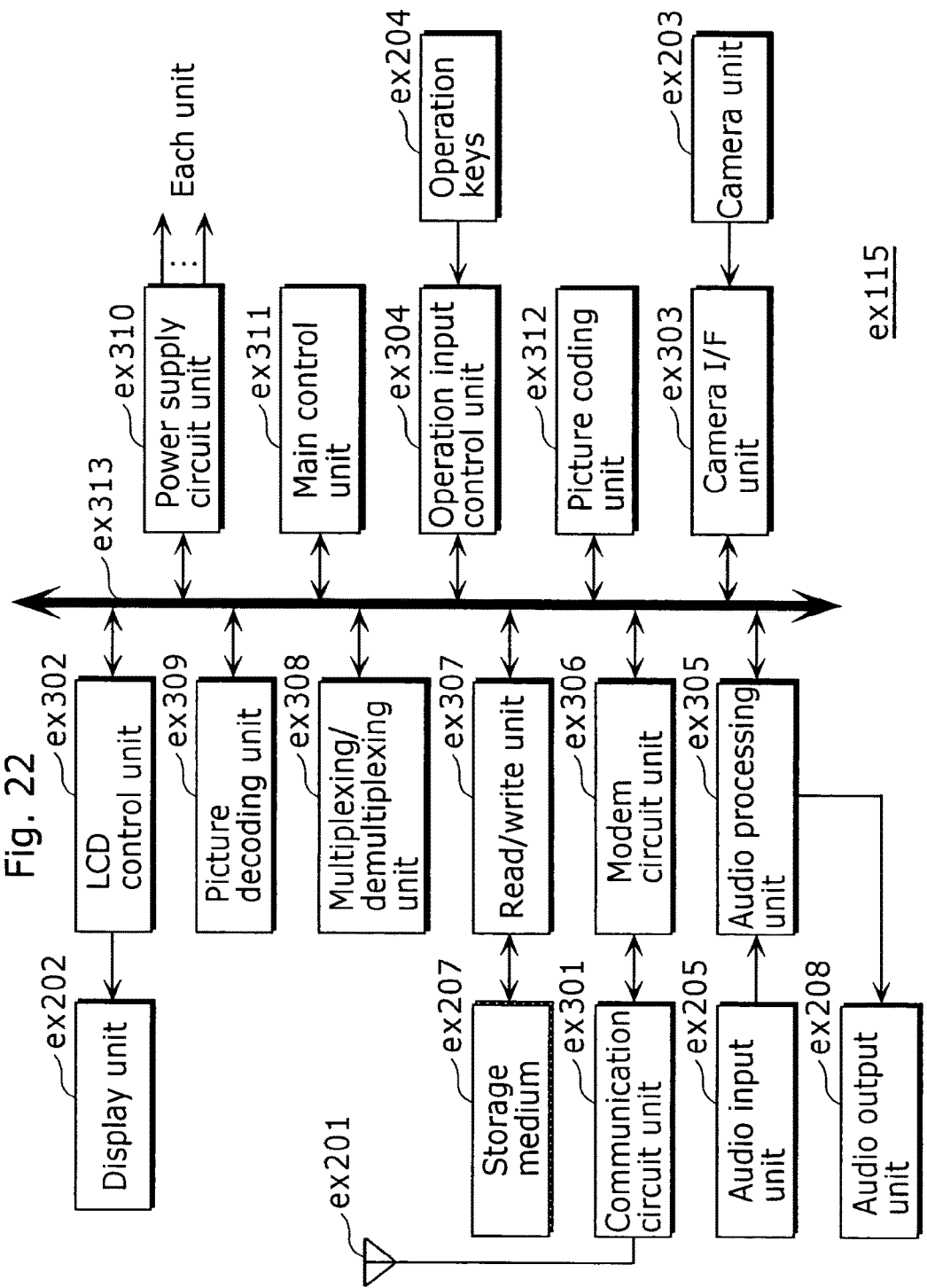
FIG. 22 is a block diagram showing an inner structure of the cell phone.

As for the structure of the car navigation system ex413, the structure without the camera unit ex203, the camera interface unit ex303 and the picture coding unit ex312, out of the components shown in FIG. 22, is conceivable. The same applies for the computer ex111, the television (receiver) ex401 and others.

In addition, three types of implementations can be conceived for a terminal such as the cell phone ex114: a sending/receiving terminal implemented with both an encoder and a decoder, a sending terminal implemented with an encoder only, and a receiving terminal implemented with a decoder only.

As described above, it is possible to use the picture coding method and the picture decoding method described in the above-mentioned embodiment for any of the above-mentioned apparatuses and systems, and by using these methods, the effects described in the above-mentioned embodiment can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Thus, the moving picture coding method or the moving picture decoding method according to the present invention is applicable as a method for generating a bit stream by coding each picture composing a moving picture or decoding the generated bit stream, using, for example, a cell phone, a DVD apparatus, a personal computer or the like.

The invention claimed is:

1. A picture decoding method for decoding a current block in a current picture in a temporal direct mode using a motion vector of an already decoded picture, the already decoded picture being a frame picture when the current picture is a frame picture and being located closely in display order to the current picture and the already decoded picture being a field picture when the current picture is a field picture and being located closely in display order to the current picture, said picture decoding method comprising:

judging when a temporal direct mode is specified or a spatial direct mode is specified;

judging when the current picture is a field picture and coded on a field unit basis or the current picture is a frame picture and coded on a frame unit basis; and in the case that a temporal direct mode is specified and the current picture is a frame picture and coded on a frame unit basis, the following steps are performed:

generating two motion vectors of the current block by scaling a reference motion vector of a co-located block included in the already decoded frame picture based on display order information of the current frame picture, the already decoded frame picture and a reference frame picture that is referred to by the co-located block; and performing motion compensation of the current block using the two motion vectors generated in said generating, and in the case that a temporal direct mode is specified and the current picture is a field picture and coded on a field unit basis, the following steps are performed:

obtaining a reference motion vector of a co-located block included in the already decoded field picture, the co-located block being co-located with the current block included in the current field picture;

judging that scaling of the reference motion vector of the co-located block cannot be performed when (i) display order information of the already decoded field picture that includes the co-located block and (ii) display order information of a reference field picture that is referred to by the co-located block in a decoding process of the co-located block, are identical, and judging that the scaling of the reference motion vector of the co-located block can be performed when (i) the display order information of the decoded field picture that includes the co-located block and (ii) the display order information of the reference field picture that is referred to by the co-located block, are not identical;

generating two motion vectors of the current block through the scaling when said judging judges that the scaling can be performed because (i) the display order information of the decoded field picture that includes the co-located block and (ii) the display order information of the reference field picture that is referred to by the co-located block, are not identical, and generating the two motion vectors of the current block by setting one of the two motion vectors to be a zero value and another of the two motion vectors to be a predetermined value without the scaling when said judging judges that the scaling cannot be performed because (i) display order information of the decoded field picture that includes the co-located block and (ii) display order information of a reference field picture that is referred to by the co-located block in a decoding process of the co-located block, are identical; and performing motion compensation of the current block using the two motion vectors generated in said generating.

* * * * *